(12) United States Patent
Zhang et al.

(10) Patent No.: US 12,210,376 B2
(45) Date of Patent: Jan. 28, 2025

(54) DISPLAY METHOD FOR FOLDABLE SCREEN AND RELATED APPARATUS

(71) Applicant: HUAWEI TECHNOLOGIES CO., LTD., Guangdong (CN)

(72) Inventors: Yuxi Zhang, Shanghai (CN); Xiaoxiao Chen, Nanjing (CN); Qi Sun, Shenzhen (CN); Guowen Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 17/793,450

(22) PCT Filed: Jan. 12, 2021

(86) PCT No.: PCT/CN2021/071333
§ 371 (c)(1),
(2) Date: Jul. 18, 2022

(87) PCT Pub. No.: WO2021/147712
PCT Pub. Date: Jul. 29, 2021

(65) Prior Publication Data
US 2023/0044497 A1    Feb. 9, 2023

(30) Foreign Application Priority Data

Jan. 21, 2020   (CN) .......................... 202010072042.1

(51) Int. Cl.
*G06F 1/00*    (2006.01)
*G06F 1/16*    (2006.01)

(52) U.S. Cl.
CPC .......... *G06F 1/1616* (2013.01); *G06F 1/1652* (2013.01); *G06F 1/1677* (2013.01); *G06F 1/1686* (2013.01)

(58) Field of Classification Search
CPC .... G06F 1/1616; G06F 1/1652; G06F 1/1677; G06F 1/1686; G06F 1/1647;
(Continued)

(56) References Cited

U.S. PATENT DOCUMENTS 10,642,485 B1 * 5/2020 Seo ..................... G06F 3/04883
2009/0278764 A1 11/2009 Kuwahara et al.
(Continued)

FOREIGN PATENT DOCUMENTS

CN    105843464 A    8/2016
CN    106131327 A    11/2016
(Continued)

*Primary Examiner* — Laurie A Ries

(57) ABSTRACT

This application discloses a display method for a foldable screen, applied to an electronic device including a foldable screen. The foldable screen can be folded to form at least two screens, and the at least two screens may include a first screen and a second screen. The method includes: When the foldable screen is in an expanded state, the electronic device displays a first interface of a first application in full screen on the foldable screen. The first interface includes an image captured by a camera. When detecting that the foldable screen changes from the expanded state to a half-folded state, the electronic device displays a second interface on the first screen. In this way, a user can conveniently perform photographing, video calling, live broadcasting, or the like without holding the electronic device steady with both hands.

15 Claims, 18 Drawing Sheets

(58) Field of Classification Search
CPC .... G06F 3/0482; G06F 3/0488; G06F 3/1446; G06F 3/1423; G09G 3/035; G09G 5/14; G09G 2300/026; G09G 2340/0492; G09G 2354/00; G09G 2380/02; H04M 1/0214; H04M 1/0241; H04M 1/72454; H04M 2250/16; H04M 2250/52
See application file for complete search history.

(56) References Cited

U.S. PATENT DOCUMENTS

| | | | |
|---|---|---|---|
| 2010/0064244 | A1 | 3/2010 | Kilpatrick, II et al. |
| 2016/0026381 | A1 | 1/2016 | Kim et al. |
| 2017/0075640 | A1 | 3/2017 | Chun et al. |
| 2017/0293383 | A1 | 10/2017 | Lee et al. |
| 2018/0039387 | A1 | 2/2018 | Cheong et al. |
| 2018/0039408 | A1* | 2/2018 | Cheong ................. G06F 3/0481 |
| 2019/0042066 | A1 | 2/2019 | Kim et al. |
| 2022/0269314 | A1* | 8/2022 | Chen ...................... G06F 1/1677 |
| 2022/0335406 | A1* | 10/2022 | Xu ...................... G06Q 20/3223 |
| 2022/0350374 | A1* | 11/2022 | Tian ......................... G06F 21/84 |
| 2022/0413553 | A1* | 12/2022 | Zhang ................... G06F 1/1686 |

FOREIGN PATENT DOCUMENTS

| | | |
|---|---|---|
| CN | 107223279 A | 9/2017 |
| CN | 107368150 A | 11/2017 |
| CN | 107566579 A | 1/2018 |
| CN | 107770312 A | 3/2018 |
| CN | 107770440 A | 3/2018 |
| CN | 108027650 A | 5/2018 |
| CN | 108667964 A | 10/2018 |
| CN | 109286720 A | 1/2019 |
| CN | 109683837 A | 4/2019 |
| CN | 110251941 A | 9/2019 |
| CN | 110381282 A | 10/2019 |
| CN | 110389802 A | 10/2019 |
| CN | 110543287 A | 12/2019 |
| CN | 110673694 A | 1/2020 |
| CN | 111263005 A | 6/2020 |
| IN | 110286972 A | 9/2019 |
| JP | 2007257220 A | 10/2007 |
| JP | 2014511524 A | 5/2014 |
| WO | 2016042864 A1 | 3/2016 |
| WO | WO-2019001152 A1 * | 1/2019 ........... G06F 1/1616 |

* cited by examiner

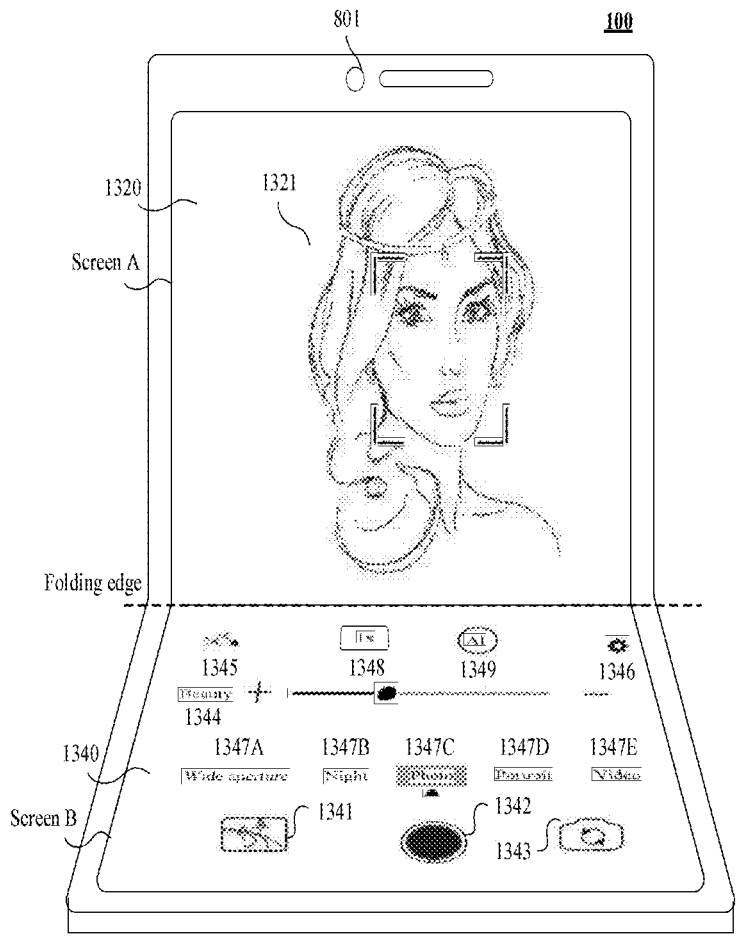

FIG. 13C

S1401: When a foldable screen is in an expanded state, an electronic device displays a first interface of a first application in full screen on the foldable screen, where the first interface includes an image captured by a camera S1402: The electronic device displays a second interface on a first screen when detecting that the foldable screen changes from the expanded state to a half-folded state

FIG. 14

DISPLAY METHOD FOR FOLDABLE SCREEN AND RELATED APPARATUS

CROSS-REFERENCE TO RELATED APPLICATIONS

This application is a national stage of International Application No. PCT/CN2021/071333, filed on Jan. 12, 2021, which claims priority to Chinese Patent Application No. 202010072042.1, filed on Jan. 21, 2020. Both of the aforementioned applications are hereby incorporated by reference in their entireties.

TECHNICAL FIELD

This application relates to the field of electronic technologies, and in particular, to a display method for a foldable screen and a related apparatus.

BACKGROUND

With continuous development of electronic devices, an increasing quantity of electronic devices with displays, such as mobile phones with displays, are applied to daily lives and work of people. In addition, with development of screen technologies, the displays of the electronic devices also become larger, to provide richer information for users and bring better use experience to the users.

However, an excessively large display of the electronic device severely affects portability of the electronic device. Therefore, electronic devices provided with foldable screens (for example, foldable mobile phones) proposed in recent years are a future development direction of electronic devices.

Currently, states of a foldable screen may include a folded state and an expanded state. When the foldable screen is in the folded state, the foldable screen may be folded to form at least two screens. The electronic device may display an interface of an application on one of the screens. After the foldable screen is expanded, a display area of the foldable screen includes the at least two screens. The electronic device may display the interface of the application on an entire display area of the foldable screen. Currently, the foldable screen having the only two states, can only fixedly display an interface of an application at a specified position of the foldable screen. This is inflexible.

SUMMARY

Embodiments of this application provide a display method for a foldable screen and an apparatus thereof, so that when a camera is turned on for a foreground application run on an electronic device and a foldable screen of the electronic device changes to a half-folded state, the electronic device can display an application interface of the foreground application on a half screen of the foldable screen. In this way, a user can conveniently take photograph, have video call and live broadcast, or the like without holding the electronic device steady with both hands.

According to a first aspect, an embodiment of this application provides a display method for a foldable screen, applied to an electronic device including a foldable screen. The foldable screen may be folded to form a first screen and a second screen. The method includes: When the foldable screen is in an expanded state, the electronic device displays a first interface of a first application in full screen on the foldable screen. The first interface includes an image captured by a camera, and the image captured by the camera is an image captured before a photographing confirmation signal is received. When detecting that the foldable screen changes from the expanded state to a half-folded state, the electronic device displays a second interface on the first screen. Content displayed in the second interface is the same as or different from content displayed in the first interface. When the foldable screen is in the expanded state, an included angle between the first screen and the second screen is greater than a first angle threshold; and when the foldable screen is in the half-folded state, the included angle between the first screen and the second screen is between the first angle threshold and a second angle threshold. The first angle threshold is greater than the second angle threshold.

According to the display method for a foldable screen provided in this embodiment of this application, when the foldable screen of the electronic device is in the half-folded state, if a foreground application (for example, a Camera application, or a WeChat application) that is run on the electronic device and that supports window display adaptation starts the camera, the electronic device may display an application interface of the foreground application on the first screen or the second screen of the foldable screen. In this way, a user can conveniently take photographs, have video call and live broadcast, or the like without holding the electronic device steady with both hands.

In a possible implementation, the method further includes: when the foldable screen is in the half-folded state, and an included angle between a plane on which the first screen is located and a horizontal plane is less than a third angle threshold, the electronic device displays the second interface on the second screen. The third angle threshold is less than the second angle threshold. In this way, when photographing the sky or photographing the ground in a high building, the user does not need to look up to be dazzled by the sun or look down, and the electronic device automatically displays, on a half screen (for example, the second screen) that is nearly vertical to the horizontal plane, an upper-layer application interface for starting the camera, to facilitate photographing of the user.

In a possible implementation, when duration in which the included angle between the first screen and the second screen remains between the first angle threshold and the second angle threshold is greater than a first time threshold, the electronic device detects that the foldable screen changes to the half-folded state. In this way, the electronic device can accurately identify that the user wants the foldable screen to enter the half-folded state. This improves determining accuracy.

In a possible implementation, the electronic device further includes a third screen, and when the foldable screen is folded, the third screen and the first screen face away from each other. The method further includes: After the electronic device enables a time-lapse photographing function, the electronic device receives a first input of the user for the second interface. The electronic device displays a countdown prompt on the first screen and the third screen in response to the first input. The countdown prompt is used to prompt the user of remaining time for the electronic device to photograph the image captured by the camera. In this way, when the owner leaves the electronic device and performs automatic countdown photographing together with another person, the countdown may be displayed on the third screen, which is convenient for the user to make a photographing posture, thereby improving user experience.

In a possible implementation, the method further includes: In response to the first input, the electronic device displays, on the third screen, the image captured by the camera.

In a possible implementation, the first application is associated with a second application, and the method further includes: When detecting that the foldable screen changes from the expanded state to the half-folded state, the electronic device displays a third interface of the second application on the second screen. In this way, an application associated with the first application can be quickly started. This improves user experience.

In a possible implementation, the first application corresponds to a plurality of associated applications, and the method further includes: When detecting that the foldable screen changes from the expanded state to the half-folded state, the electronic device displays options of the plurality of associated applications on the second screen. The electronic device receives a second input of the user for an option corresponding to a second application. The electronic device displays a third interface of the second application on the second screen in response to the second input.

In a possible implementation, the method further includes: The electronic device displays a switch control on the first screen or the second screen. The electronic device receives a third input of the user for the switch control. In response to the third input, the electronic device displays the third interface on the first screen, and displays the second interface on the second screen. In this way, an interface displayed on the first screen and an interface displayed on the second screen can be switched based on a user requirement. This improves user experience.

In a possible implementation, the first interface further includes one or more operation controls; and when detecting that the foldable screen changes from the expanded state to the half-folded state, the electronic device displays a fourth interface on the second screen. The fourth interface includes the one or more operation controls, and the second interface includes the image captured by the camera. In this way, the electronic device may rearrange controls in the application interface based on a physical form of the foldable screen, so that the user obtains better visual experience when viewing and using the foldable screen.

According to a second aspect, an embodiment of this application provides an electronic device, including a foldable screen, an acceleration sensor, a gyroscope sensor, one or more cameras, one or more processors, and one or more memories. The foldable screen can be folded to form at least two screens, the at least two screens include a first screen and a second screen, and the foldable screen, the acceleration sensor, the gyroscope sensor, the one or more cameras, and the one or more memories are separately coupled to the one or more processors. The acceleration sensor and the gyroscope sensor are configured to detect data, so that the one or more processors detect an included angle between the first screen and the second screen. The one or more memories are configured to store computer program code. The computer program code includes computer instructions, and when the computer instructions are run on the processor, the electronic device is enabled to perform the following steps: when the foldable screen is in an expanded state, displaying a first interface of a first application in full screen on the foldable screen, where the first interface includes an image captured by the camera, and the image captured by the camera is an image captured before a photographing confirmation signal is received; and when detecting that the foldable screen changes from the expanded state to a half-folded state, displaying a second interface on the first screen, where content displayed in the second interface is the same as or different from content displayed in the first interface. When the foldable screen is in the expanded state, an included angle between the first screen and the second screen is greater than a first angle threshold; and when the foldable screen is in the half-folded state, the included angle between the first screen and the second screen is between the first angle threshold and a second angle threshold. The first angle threshold is greater than the second angle threshold.

According to the electronic device provided in this application, when the foldable screen of the electronic device is in the half-folded state, if a foreground application (for example, a Camera application, or a WeChat application) that is run on the electronic device and that supports window display adaptation starts the camera, the electronic device may display an application interface of the foreground application on a screen A or a screen B of the foldable screen. In this way, a user can conveniently perform photographing, video calling, live broadcasting, or the like without holding the electronic device steady with both hands.

In a possible implementation, when the computer instructions are run on the processor, the electronic device further performs the following step: when the foldable screen is in the half-folded state, and an included angle between a plane on which the first screen is located and a horizontal plane is less than a third angle threshold, displaying the second interface on the second screen, where the third angle threshold is less than the second angle threshold. In this way, when photographing the sky or photographing the ground in a high building, the user does not need to look up to be dazzled by the sun or look down, and the electronic device automatically displays, on a half screen (for example, the second screen) that is nearly vertical to the horizontal plane, an upper-layer application interface for starting the camera, to facilitate photographing of the user.

In a possible implementation, when the foldable screen is folded inward, and duration in which the included angle between the first screen and the second screen remains between the first angle threshold and the second angle threshold is greater than a first time threshold, the electronic device detects that the foldable screen changes to the half-folded state. In this way, the electronic device can accurately identify that the user wants the foldable screen to enter the half-folded state. This improves determining accuracy.

In a possible implementation, the electronic device further includes a third screen, and when the foldable screen is folded, the third screen and the first screen face away from each other. When the computer instructions are run on the processor, the electronic device is enabled to further perform the following steps: receiving a first input of the user after enabling a time-lapse photographing function; and displaying a countdown prompt on the first screen and the third screen in response to the first input, where the countdown prompt is used to prompt the user of remaining time for the electronic device to photograph the image captured by the camera. In this way, when the owner leaves the electronic device and performs automatic countdown photographing together with another person, the countdown may be displayed on the third screen, which is convenient for the user to make a photographing posture, thereby improving user experience.

In a possible implementation, when the computer instructions are run on the processor, the electronic device is enabled to further perform the following step: in response to the first input, displaying, on the third screen, the image captured by the camera in real time.

In a possible implementation, the first application is associated with a second application, and when the computer instructions are run on the processor, the electronic device is enabled to further perform the following step: when detecting that the foldable screen changes from the expanded state to the half-folded state, displaying a third interface of the second application on the second screen. In this way, an application associated with the first application can be quickly started. This improves user experience.

In a possible implementation, the first application corresponds to a plurality of associated applications, and when the computer instructions are run on the processor, the electronic device is enabled to further perform the following steps: when detecting that the foldable screen changes from the expanded state to the half-folded state, displaying options of the plurality of associated applications on the second screen; receiving a second input of the user for an option corresponding to a second application; and displaying a third interface of the second application on the second screen in response to the second input.

In a possible implementation, when the computer instructions are run on the processor, the electronic device is enabled to further perform the following steps: displaying a switch control on the first screen or the second screen; receiving a third input of the user for the switch control; and in response to the third input, displaying, by the electronic device, the third interface on the first screen, and displaying the second interface on the second screen.

In a possible implementation, the first interface includes one or more operation controls, and when the computer instructions are run on the processor, the electronic device is enabled to further perform the following step: when detecting that the foldable screen changes from the expanded state to the half-folded state, displaying a fourth interface on the second screen. The fourth interface includes the one or more operation controls, and the second interface includes the image captured by the camera. In this way, the electronic device may rearrange controls in the application interface based on a physical state of the foldable screen, so that the user obtains better visual experience when viewing and using the foldable screen.

According to a third aspect, an embodiment of this application provides an electronic device, including one or more function modules. The one or more function modules may be configured to perform the display method for a foldable screen according to any possible implementation of any one of the foregoing aspects.

According to a fourth aspect, this application provides a computer storage medium, including computer instructions. When the computer instructions are run on an electronic device, a communication apparatus is enabled to perform the display method for a foldable screen according to any possible implementation of any one of the foregoing aspects.

According to a fifth aspect, this application provides a computer program product. When the computer program product runs on a computer, the computer is enabled to perform the display method for a foldable screen according to any possible implementation of any one of the foregoing aspects.

According to a sixth aspect, this application provides a chip, including a processor and an interface. The processor and the interface cooperate with each other, so that the chip performs the display method for a foldable screen according to any possible implementation of any one of the foregoing aspects.

BRIEF DESCRIPTION OF DRAWINGS

FIG. 13A to FIG. 13C are schematic diagrams of another group of interfaces according to an embodiment of this application; and FIG. 14 is a schematic flowchart of a display method for a foldable screen according to an embodiment of this application.

DESCRIPTION OF EMBODIMENTS

The following clearly describes technical solutions in embodiments of this application in detail with reference to the accompanying drawings. In descriptions of embodiments of this application, "I" indicates "or" unless otherwise specified. For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

An embodiment of this application provides a display method for a foldable screen. The method may be applied to an electronic device 100 having a foldable screen. The foldable screen may be folded to form at least two screens. For example, the foldable screen may be folded along a folding edge or a folding axis to form a first screen and a second screen.

Manners of folding the foldable screen on the electronic device 100 may be classified into two types. One type is a foldable screen that is folded outward (briefly referred to as an outward foldable screen), and the other type is a foldable screen that is folded inward (briefly referred to as an inward foldable screen). For example, the foldable screen may be folded to form the first screen and the second screen. After the outward foldable screen is folded, a display direction of the first screen and a display direction of the second screen face away from each other. After the inward foldable screen is folded, a display direction of the first screen and a display direction of the second screen face each other. In this embodiment of this application, the first screen may be referred to as a screen A, and the second screen may be referred to as a screen B.

In this embodiment of this application, the electronic device 100 uses the inward foldable screen. In other words, the display direction of the first screen and the display direction of the second screen face each other.

Figure 1:
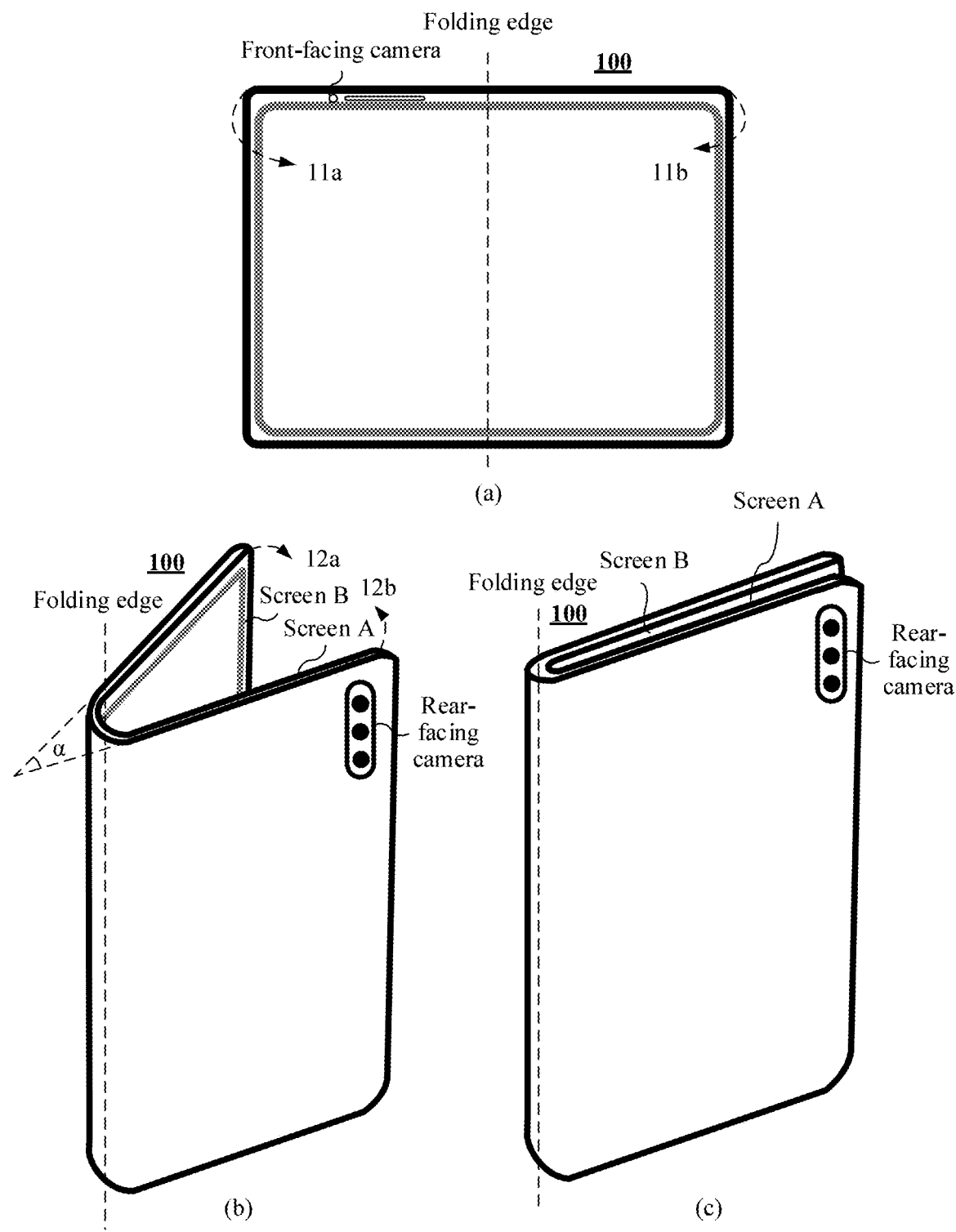
FIG. 1 is a schematic diagram of a product state of an electronic device according to an embodiment of this application.

For example, FIG. 1 is a schematic diagram of a product form of the electronic device 100 having an inward foldable screen according to an embodiment of this application. (a) in FIG. 1 is a schematic diagram of a state in which the inward foldable screen is fully expanded. The inward foldable screen may be folded along a folding edge in directions 11a and 11b shown in (a) in FIG. 1, to form a screen A and a screen B in a half-folded state shown in (b) in FIG. 1. After the foldable screen is folded into the screen A and the screen B, the screen A and a front-facing camera on the electronic device 100 may be on a same side. The inward foldable screen may be folded along the folding edge based on the screen A and the screen B shown in (b) in FIG. 1. The inward foldable screen may continue to be folded along the folding edge in directions 12a and 12b shown in (b) in FIG. 1, to form a valgus foldable screen in a fully folded state shown in (c) in FIG. 1. As shown in (c) in FIG. 1, after the foldable screen of the electronic device 100 is fully folded, the screen A and the screen B face each other, and are invisible to a user.

It should be noted that, a display may be further disposed on a back of the first screen or the second screen of the inward foldable screen provided in this embodiment of this application, and may be referred to as a third screen. For example, as shown in (a) in FIG. 2, a screen C (namely, the third screen) may be disposed on a back of the screen A (namely, the first screen). As shown in (b) in FIG. 2, after the inward foldable screen is fully folded, the screen C and the screen A face away from each other, and the screen C is visible to the user. The screen C and a rear-facing camera on the electronic device 100 may be on a same side. It may be understood that, for the electronic device 100 having the inward foldable screen, when the foldable screen is in a fully folded state, an interface may be displayed on the third screen; when the foldable screen is in a half-folded state, an interface may be displayed on the first screen, the second screen, and the third screen; or when the foldable screen is in an expanded state, an interface may be displayed on the first screen and the second screen.

Figure 2:
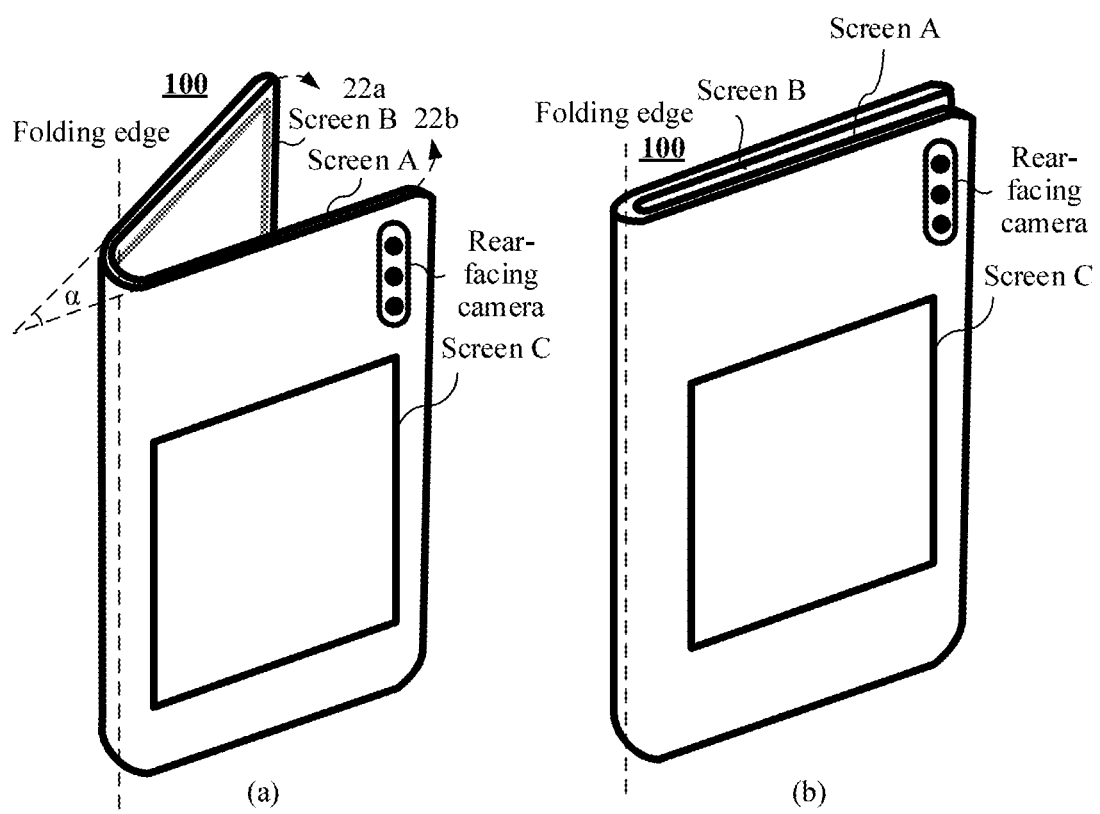
FIG. 2 is a schematic diagram of a product form of another electronic device according to an embodiment of this application.
Figure 3:
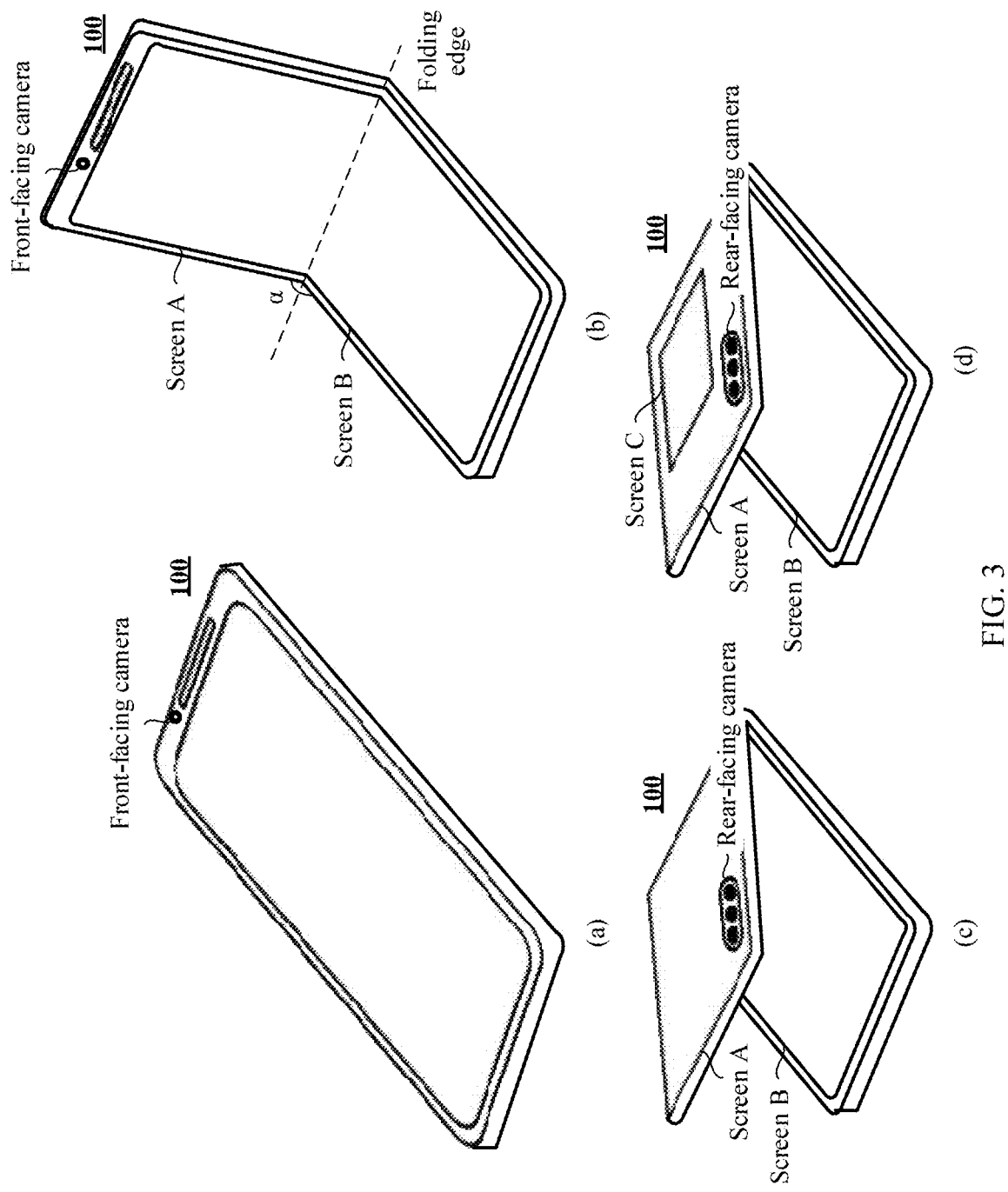
FIG. 3 is a schematic diagram of a product form of another electronic device according to an embodiment of this application.

In FIG. 1 and FIG. 2, the foldable screen of the electronic device 100 is folded vertically, that is, the foldable screen is folded into a left screen and a right screen (namely, the screen A and the screen B) based on a vertical folding edge of the foldable screen. In an embodiment of this application, a foldable screen of the electronic device 100 may alternatively be folded horizontally, that is, the foldable screen is folded into an upper screen and a lower screen (namely, a screen A and a screen B) based on a horizontal folding edge of the foldable screen. For example, a foldable screen shown in (a) in FIG. 3 is folded along a folding edge in a horizontal direction of the foldable screen to sequentially form the foldable screen shown in (b) in FIG. 3, and the foldable screen shown in (c) in FIG. 3 or (d) in FIG. 3.

In some embodiments of this application, a display may be disposed on a back of the first screen or the second screen of the electronic device 100, and may be referred to as a third screen. For example, as shown in (d) in FIG. 3, a screen C (namely, the third screen) may be disposed on a back of the screen A (namely, the first screen), and the screen C may be on a same side as the rear-facing camera of the electronic device 100.

In some embodiments, the foldable screen of the electronic device 100 may surround a periphery of the electronic device 100, and the screen A (the first screen), the screen B (the second screen), and the screen C (the third screen) may all be a part of the foldable screen. When the foldable screen is folded, the screen A and the screen C may face away from each other, and the screen A is adjacent to the screen B.

In this embodiment of this application, a value range of an included angle between the screen A and the screen B of the foldable screen of the electronic device 100 is [0°, 180°]. If $\alpha \in [0°, P1]$, the electronic device 100 may determine that the foldable screen is in a fully folded state. If $\alpha \in (P1, P2)$, the electronic device 100 may determine that the foldable screen is in a half-folded state. If $\alpha \in [P2, 180°]$, the electronic device 100 may determine that the foldable screen is in a fully expanded state. Herein, $0° < P1 < P2 < 180°$. P1 and P2 each may be a preset angle threshold. P1 and P2 may be determined based on usage habits of a large quantity of users using foldable screens, or P1 and P2 may be set by the user in the electronic device 100.

In some embodiments, based on usage habits of most users, when the included angle α between the screen A and the screen B is greater than 100°, there is a high probability that the user expects to use the screen A and the screen B as a whole (that is, as a complete display). When the included angle α between the screen A and the screen B is less than 80 degrees, there is a high probability that the user expects to use the screen A or the screen B independently, and the foldable screen may be in a fully folded state. When the included angle α between the screen A and the screen B is between 80 degrees and 100 degrees, there is a high probability that the user expects to use the screen A and the screen B to display different display content, and the foldable screen may be in a half-folded state.

Therefore, in this embodiment of this application, a value range of the preset angle threshold P1 may be (0°, 80°], and a value range of the preset angle threshold P2 may be [100°, 180°). For example, the preset angle threshold P1 may be 75°, and the preset angle threshold P2 may be 105°. The foregoing example is merely used to explain this application and shall not be construed as a limitation.

It should be noted that, in this embodiment of this application, at least two screens formed by folding the foldable screen may be a plurality of screens that exist independently, or may be a complete screen of an integrated structure that is folded to form at least two parts.

For example, the foldable screen may be a flexible foldable screen, and the flexible foldable screen includes a folding edge made of a flexible material. A part or all of the flexible foldable screen is made of a flexible material. At least two screens formed by folding the flexible foldable screen are a complete screen of an integrated structure that is folded to form at least two parts.

For another example, the foldable screen may be a multi-screen foldable screen. The multi-screen foldable screen may include a plurality of (two or more) screens. The plurality of screens are a plurality of separate displays. The plurality of screens may be connected sequentially through folding axes. Each screen may rotate around a folding axis connected to the screen, so that the multi-screen foldable screen is folded.

In a subsequent embodiment of this application, an example in which the foldable screen is a flexible foldable screen that can be folded horizontally is used to describe the method provided in this embodiment of this application.

For example, the electronic device 100 in this embodiment of this application may be a device including the foregoing foldable screen, such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific type of the electronic device 100 is not specifically limited in this embodiment of this application.

The following describes, with reference to the accompanying drawings, the electronic device 100 provided in embodiments of this application.

Figure 4:
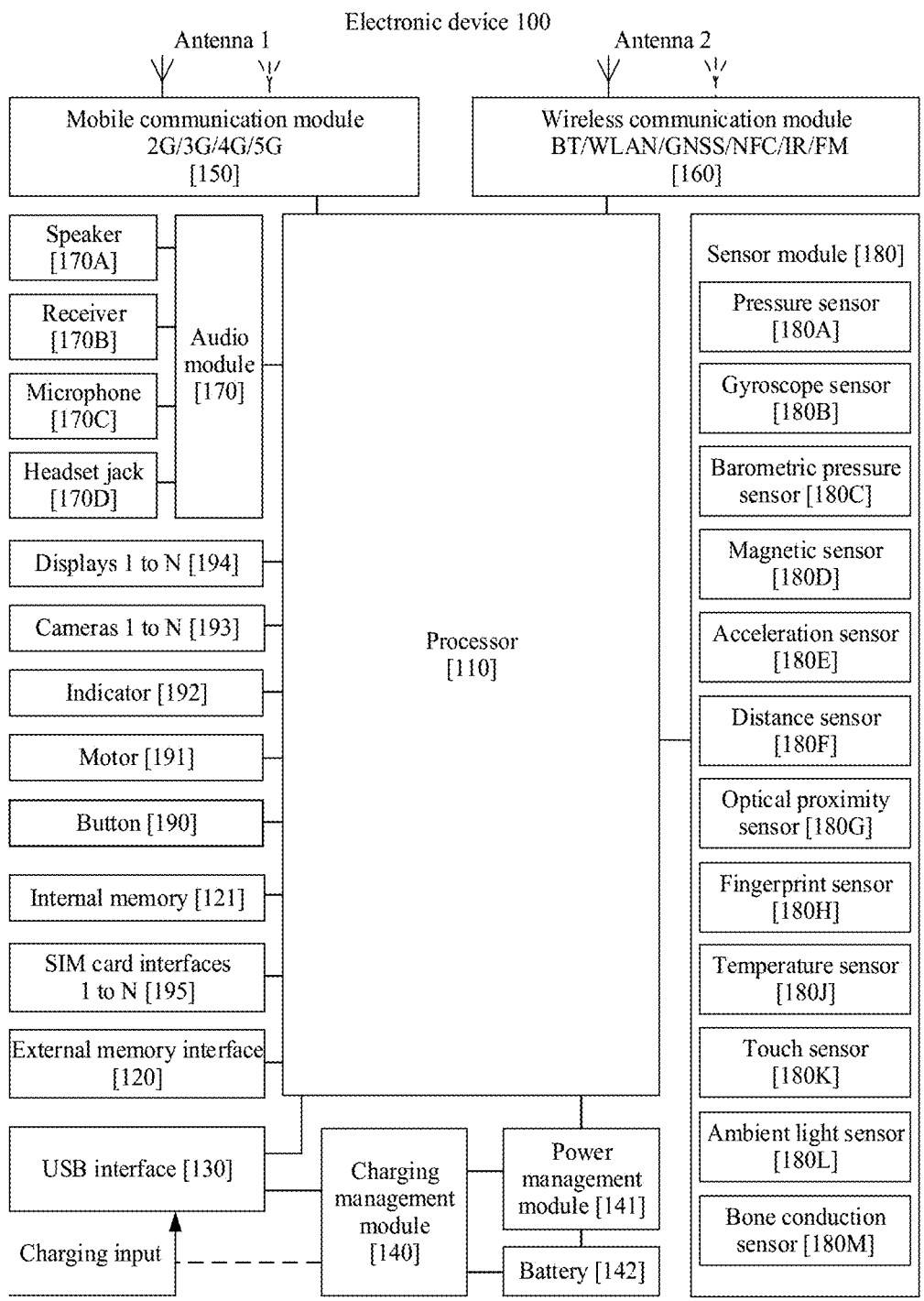
FIG. 4 is a schematic diagram of a structure of an electronic device according to an embodiment of this application.

FIG. 4 is a schematic diagram of a structure of an electronic device 100.

The electronic device 100 is used as an example below to describe embodiments in detail. It should be understood that the electronic device 100 shown in FIG. 4 is merely an example, and the electronic device 100 may have more or fewer components than those shown in FIG. 4, or may combine two or more components, or may have different component configurations. Various components shown in the figure may be implemented by using hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In other embodiments of this application, the electronic device 100 may include more or fewer components than those shown in the figure, combine some components, split some components, or have different component arrangements. The components shown in the figure may be implemented through hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset, to play audio through the headset. Alternatively, the interface may be configured to connect to another electronic device, for example, an AR device.

It may be understood that an interface connection relationship between the modules that is shown in this embodiment of the present invention is merely an example for description, and constitutes no limitation on the structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger, or may be a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, and the like), or displays an image or a video on the display 194. In some embodiments, the modem processor may be an independent device. In some other embodiments, the modem processor may be independent of the processor 110, and is disposed in the same device as the mobile communication module 150 or another function module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 may include the inward foldable screen. In some embodiments, the display 194 includes the inward foldable screen and the screen C, for example, as shown in (a) in FIG. 2 or as shown in (d) in FIG. 3.

The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 can implement a photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 performs various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data, and a phone book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert an analog audio input into a digital audio signal. The audio module 170 may be further configured to code and decode audio signals. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of Messages, an instruction for viewing an SMS message is performed. When a touch operation whose touch operation intensity is greater than or equal to the first pressure threshold is performed on the application icon "Messages", an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in navigation and motion sensing game scenarios.

In this embodiment of this application, the display 194 of the electronic device 100 may be folded to form a plurality of screens. The gyroscope sensor 180B may be disposed in each of the plurality of screens, and is configured to measure an orientation (that is, a direction vector of the orientation) of the corresponding screen. The electronic device 100 may determine an included angle between adjacent screens (for example, an included angle between a screen A and a screen B) based on an angle change of the orientation that is of each screen and that is measured by the gyroscope sensor 180B.

It should be noted that in this embodiment of this application, a foldable screen (for example, the display 194) of the electronic device 100 may be folded to form a plurality of screens. Each screen may include a gyroscope sensor (for example, the gyroscope sensor 180B), configured to measure an orientation (that is, a direction vector of the orientation) of the corresponding screen. For example, with reference to FIG. 1, FIG. 2, or FIG. 3, the display 194 of the electronic device 100 may be folded to form the screen A (that is, the first screen) and the screen B (that is, the second screen). In this case, both the screen A and the screen B include gyroscope sensors 180B that are separately configured to measure orientations of the screen A and the screen B. The electronic device 100 may determine an included angle between adjacent screens and an angle relationship between each screen and a horizontal plane based on an angle change of the measured orientation of each screen.

Figure 5A:
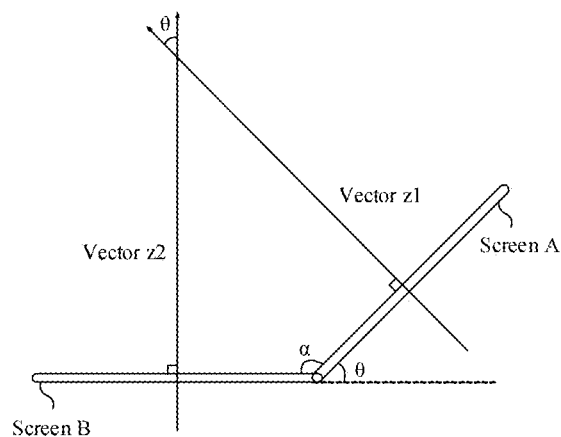
FIG. 5A is a schematic diagram of a principle of calculating an included angle $\alpha$ between a screen A and a screen B according to an embodiment of this application.

For example, the foldable screen of the electronic device 100 may be folded to form a screen A and a screen B shown in FIG. 5A. A gyroscope sensor A is disposed on the screen A, and a gyroscope sensor B is disposed on the screen B. A principle of measuring an orientation (that is, a direction vector of an orientation) of the screen A by the gyroscope sensor A and measuring an orientation (that is, a direction vector of an orientation) of the screen B by the gyroscope sensor B, and a principle of calculating an included angle α between the screen A and the screen B by the electronic device 100 based on the orientation of the screen A and the orientation of the screen B are described in this embodiment of this application.

Figure 5B:
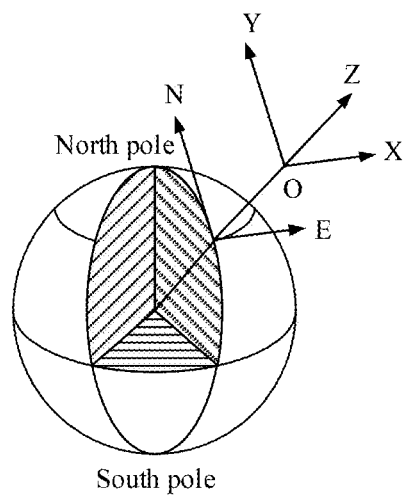
FIG. 5B is a schematic diagram of an example of a geographic coordinate system according to an embodiment of this application.

A coordinate system of the gyroscope sensor is a geographic coordinate system. As shown in FIG. 5B, in the geographic coordinate system, an origin O is located at a point at which a carrier (that is, a device including the gyroscope sensor, for example, the electronic device 100) is located, an axis X points to the east (E) along a local latitude line, an axis Y points to the north (N) along a local meridian line, and an axis Z points upward along a local geographic perpendicular line and forms a right-hand rectangular coordinate system together with the axis X and the axis Y. A plane formed by the axis X and the axis Y is a local horizontal plane, and a plane formed by the axis Y and the axis Z is a local meridian plane. Therefore, it may be understood that a coordinate system of the gyroscope sensor is as follows: using the gyroscope sensor as the origin O, using a direction pointing to the east along the local latitude line as the axis X, using a direction pointing to the north along the local meridian line as the axis Y, and using a direction pointing upward along the local geographic perpendicular line (that is, in a reverse direction of the geographic perpendicular line) as the axis Z.

The electronic device 100 may learn, through measurement by using the gyroscope sensor disposed on each screen, a direction vector of an orientation of each screen in a coordinate system of the gyroscope sensor disposed on each screen. For example, refer to a side view of the electronic device 100 shown in FIG. 5A. The electronic device 100 learns, through measurement, that the direction vector of the orientation of the screen A in a coordinate system of the gyroscope sensor A is a vector $\vec{z1}$, and the direction vector of the orientation of the screen B in a coordinate system of the gyroscope sensor B is a vector $\vec{z2}$. . . . The electronic device 100 may calculate an included angle θ between the vector $\vec{z1}$ and the vector $\vec{z2}$ by using the following Formula (1):

$$\theta = \arccos\left(\frac{\vec{z1} \cdot \vec{z2}}{|\vec{z1}| \times |\vec{z2}|}\right) \quad \text{Formula (1)}$$

It can also be learned from FIG. 5A that, because the vector $\vec{z1}$ is perpendicular to the screen A and the vector $\vec{z2}$ is perpendicular to the screen B, the included angle α between the screen A and the screen B may be obtained: α=180°−θ. In other words, the electronic device 100 may determine the included angle α between the screen A and the screen B based on the measured direction vector (that is, the vector $\vec{z1}$) of the orientation of the screen A in the coordinate system of the gyroscope sensor A and the measured direction vector (that is, the vector $\vec{z2}$) of the orientation of the screen B in the coordinate system of the gyroscope sensor B.

It should be noted that, although locations of the gyroscope sensors disposed on the screen A and the screen B do not overlap, that is, origins of the coordinate systems of the gyroscope sensors on the screen A and the screen B do not overlap, axes X, axes Y, and axes Z in the two coordinate systems are parallel. Therefore, it may be considered that the coordinate systems of the gyroscope sensors disposed on the screen A and the screen B are parallel. In this way, although the vector $\vec{z1}$ and the vector $\vec{z2}$ are not in a same coordinate system, the included angle θ between the vector $\vec{z1}$ and the vector $\vec{z2}$ may still be calculated by using Formula (1) because axes in the two coordinate systems are parallel.

In some embodiments, the included angle α between the screen A and the screen B may alternatively be measured through cooperation with one or more other sensors. For example, one acceleration sensor may be disposed on each screen of the foldable screen. The electronic device 100 (for example, the processor 110) may measure, by using the acceleration sensor, a motion acceleration when each screen is rotated; and then calculate, based on the measured motion acceleration, an angle at which one screen rotates relative to another screen, that is, the included angle α between the screen A and the screen B.

In some other embodiments, the gyroscope sensor may be a virtual gyroscope sensor formed by cooperating with a plurality of other sensors. The virtual gyroscope sensor may be configured to calculate an included angle between adjacent screens of the foldable screen, that is, the included angle α between the screen A and the screen B.

In some other embodiments, an angle sensor is installed on a folded part (for example, a rotating shaft) of a folding line of the electronic device 100. The electronic device 100 may measure the included angle α between the screen A and the screen B by using the angle sensor disposed on the folded part of the foldable screen.

In some embodiments of this application, the electronic device 100 may further measure an included angle β1 between the screen A and the horizontal plane and an included angle β2 between the screen B and the horizontal plane by using the gyroscope 180B.

Figure 6:
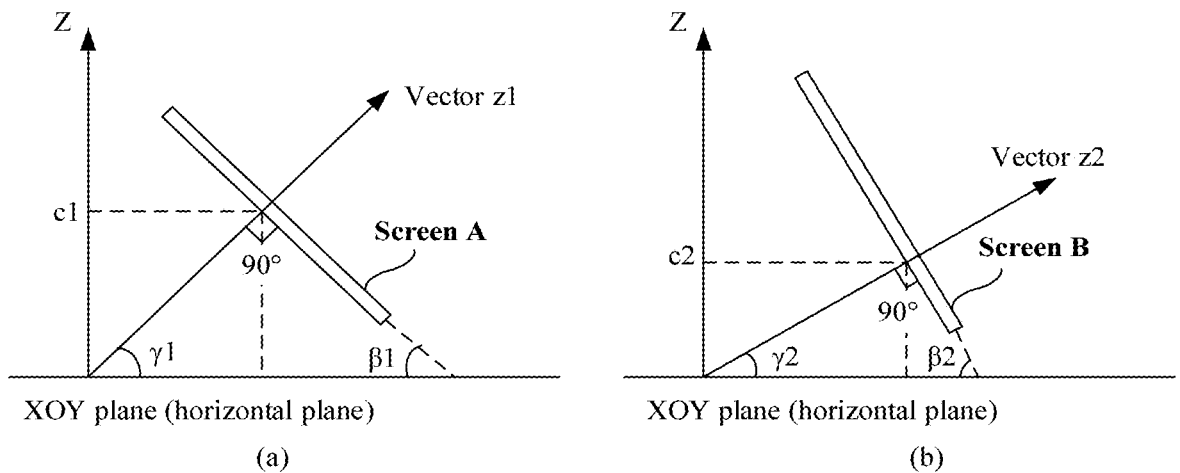
FIG. 6 is a schematic diagram of a principle of calculating an included angle $\beta 1$ between a plane on which a screen A is located and a horizontal plane and an included angle $\beta 2$ between a plane on which a screen B is located and the horizontal plane according to an embodiment of this application.

(a) in FIG. 6 shows a coordinate system of a gyroscope sensor of the screen A of the electronic device 100. A plane formed by the axis X and the axis Y is a local horizontal plane, and a plane formed by the axis Y and the axis Z is a local meridian plane. A direction vector of an orientation of the screen A of the electronic device 100 in the coordinate system of the gyroscope sensor is a vector $\vec{z1}=(a1, b1, c1)$. An included angle $\gamma1$ between the vector $\vec{z1}$ and an XOY plane (that is, a horizontal plane) has the following relationship: $c1=|\vec{z1}| \times \sin\gamma1$. The screen A of the electronic device 100 is perpendicular to the vector $\vec{z1}$, and an included angle $\beta1$ between a plane on which the screen A of the electronic device 100 is located and the XOY plane (that is, the horizontal plane) and the included angle $\gamma1$ are complementary to each other, that is, $\beta1+\gamma1=90°$. It can be learned that the vector $\vec{z1}$ and the included angle $\beta1$ between the plane on which the screen A of the electronic device 100 is located and the horizontal plane has the following relationship: $c1=\vec{z1} \times \cos\beta1$, where $$\beta1 = \arccos\left(\frac{c1}{|\vec{z1}|}\right) \quad \text{Formula (2)}$$

(b) in FIG. 6 shows a coordinate system of a gyroscope sensor of the screen B of the electronic device 100. A plane formed by the axis X and the axis Y is a local horizontal plane, and a plane formed by the axis Y and the axis Z is a local meridian plane. A direction vector of an orientation of the screen B of the electronic device 100 in the coordinate system of the gyroscope sensor is a vector $\vec{z2}=(a2, b2, c2)$. An included angle $\gamma2$ between the vector $\vec{z2}$ and an XOY plane (that is, a horizontal plane) has the following relationship: $c2=\vec{z2} \times \sin\gamma2$. The screen B of the electronic device 100 is perpendicular to the vector $\vec{z2}$, and an included angle $\beta2$ between a plane on which the screen B of the electronic device 100 is located and the XOY plane (that is, the horizontal plane) and the included angle $\gamma2$ are complementary to each other, that is, $\beta2+\gamma2=90°$. It can be learned that the vector $\vec{z2}$ and the included angle $\beta2$ between the plane on which the screen B of the electronic device 100 is located and the horizontal plane has the following relationship: $c2=\vec{z2} \times \cos\beta2$, where $$\beta2 = \arccos\left(\frac{c2}{|\vec{z2}|}\right) \quad \text{Formula (3)}$$

In conclusion, the electronic device 100 may determine the included angle $\beta1$ between the screen A of the electronic device 100 and the horizontal plane by using the foregoing formula (2) and based on the measured direction vector $\vec{z1}=(a1, b1, c1)$ of the orientation of the screen A in the coordinate system of the gyroscope sensor. The electronic device 100 may determine the included angle $\beta2$ between the screen B of the electronic device 100 and the horizontal plane by using the foregoing formula (3) and based on the measured direction vector $\vec{z2}=(a2, b2, c2)$ of the orientation of the screen B in the coordinate system of the gyroscope sensor.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application access locking, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (such as a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of the present invention, an Android system with a layered architecture is used as an example to describe a software structure of the electronic device 100.

Figure 7A:
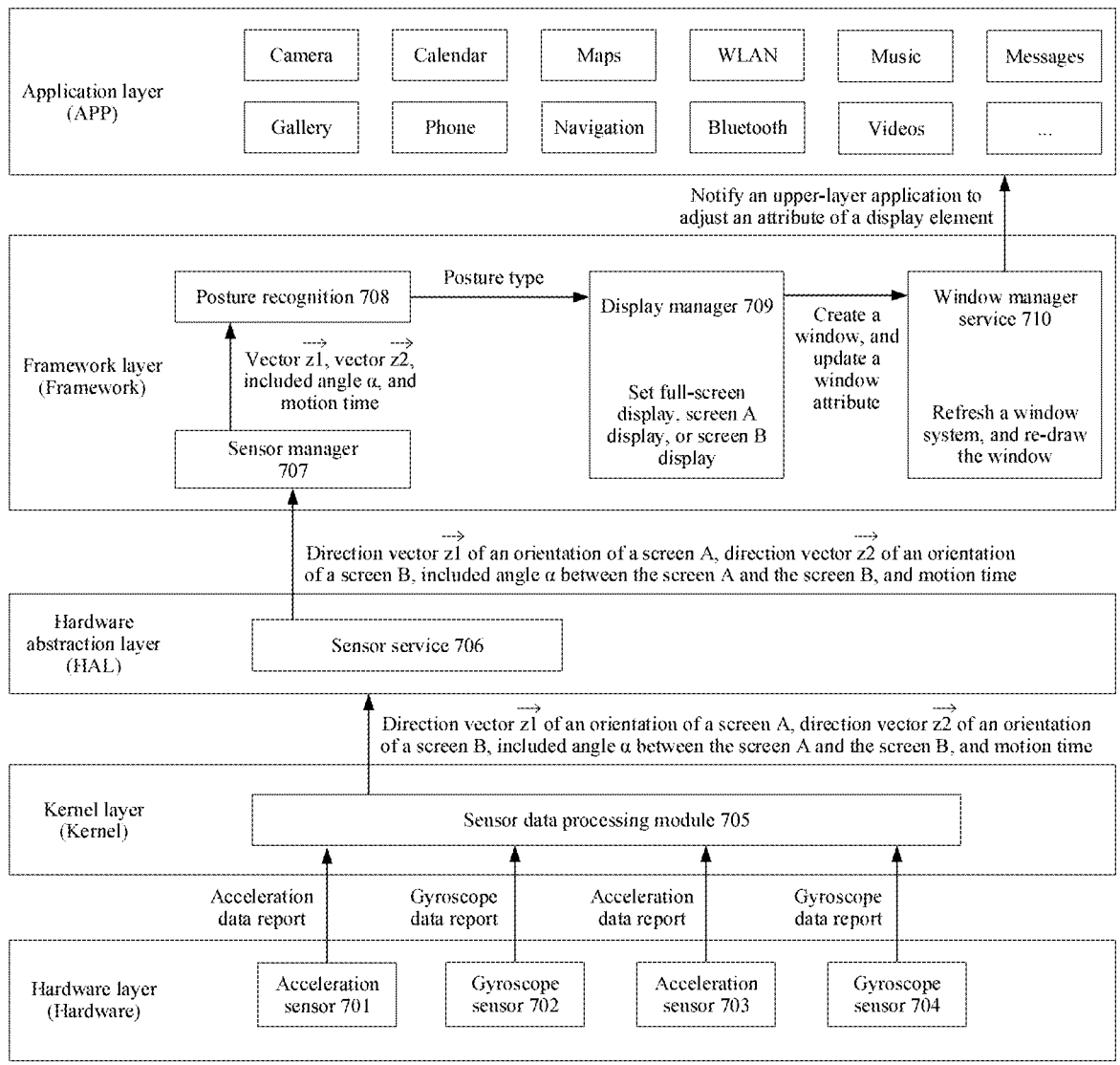
FIG. 7A is a schematic diagram of a software architecture of an electronic device according to an embodiment of this application.

FIG. 7A is a block diagram of the software structure of the electronic device 100 according to this embodiment of this application.

In the layered architecture, software is divided into several layers, and each layer has a clear role and task. The layers communicate with each other through a software interface. In some embodiments, the Android system is divided into four layers, namely, an application layer, an application framework layer, an Android runtime (Android runtime) and system library, and a kernel layer from top to bottom.

The application (application, APP) layer may include a series of application packages. As shown in FIG. 7A, the application packages may include applications such as Camera, Gallery, Calendar, Phone, Maps, Navigation, WLAN, Bluetooth, Music, Videos, and Messages.

The application framework (Framework) layer provides an application programming interface (application programming interface, API) and a programming framework for an application at the application layer. The application framework layer includes some predefined functions. As shown in FIG. 7A, the framework layer may include a sensor manager (sensor manager) 707, posture recognition (posture recognition) 708, a display manager (display manager) 709, and a window manager service (window manager service, WMS) 710. Optionally, the framework layer may further include an activity manager service (activity manager service, AMS), a content provider, a view system, a phone manager, a resource manager, a notification manager, and the like (not shown in the accompanying drawing).

A window manager is configured to manage a window program. The window manager may obtain a size of a display, determine whether there is a status bar, perform screen locking, take a screenshot, and the like.

The hardware abstraction layer (hardware abstraction layer, HAL) includes a sensor service (sensor service) 706.

The sensor service 706 may be configured to report a processing result of a sensor data processing module 705 at the kernel layer to the sensor manager 707 at the framework layer.

The kernel (Kernel) layer is a layer between hardware and software. The kernel layer may include the sensor data processing module 705. The sensor data processing module 705 may be configured to: obtain data reported by one or more sensors at a hardware (Hardware) layer, perform processing, and report a processing result to the sensor service 706.

The hardware layer may include an acceleration sensor 701, a gyroscope sensor 702, an acceleration sensor 703, a gyroscope sensor 704, and the like. The acceleration sensor 701 and the gyroscope sensor 702 may be disposed on a screen A of the electronic device 100, and the acceleration sensor 703 and the gyroscope sensor 704 may be disposed on a screen B of the electronic device 100. The acceleration sensor 701 may be configured to: measure acceleration data of the screen A, and report the acceleration data to the sensor data processing module 705. The acceleration sensor 703 may be configured to: measure acceleration data of the screen B, and report the acceleration data to the sensor data processing module 705. The gyroscope sensor 702 may be configured to: measure gyroscope data of the screen A, and report the gyroscope data to the sensor data processing module 705. The gyroscope sensor 704 may be configured to: measure gyroscope data of the screen B, and report the gyroscope data to the sensor data processing module 705.

When the user performs an input operation (for example, an operation of folding a screen) on the electronic device 100, the acceleration sensor 701, the gyroscope sensor 702, the acceleration sensor 703, and the gyroscope sensor 704 at the hardware layer may report sensor data measured by each of the acceleration sensor 701, the gyroscope sensor 702, the acceleration sensor 703, and the gyroscope sensor 704 to the sensor data processing module 705 at the kernel layer. The sensor data processing module 705 may calculate, based on the sensor data reported by the plurality of sensors at the hardware layer, a direction vector $\vec{z1}$ of an orientation of the screen A, a direction vector $\vec{z2}$ of an orientation of the screen B, and an included angle α between the screen A and the screen B. Then, the sensor data processing module 705 may report the direction vector $\vec{z1}$ of the orientation of the screen A, the direction vector $\vec{z2}$ of the orientation of the screen B, and the included angle α between the screen A and the screen B to the sensor manager 707 at the framework layer by using the sensor service 706 at the hardware abstraction layer. The sensor manager 707 may be configured to send the vector $\vec{z1}$, the vector $\vec{z2}$, and the included angle α to the posture recognition 708. The posture recognition 708 may recognize a posture type of the foldable screen of the electronic device 100 based on the vector $\vec{z1}$, the vector $\vec{z2}$, and the included angle α, and send the posture type to the display manager 709. The display manager 709 may set full screen display, screen A display, screen B display, or the like of the foldable screen based on the posture type. The display manager 709 may notify the window manager service 710 to create a window and update a window attribute (for example, a size or a location). The window manager service 710 may refresh a window system, redraw a window, and notify an upper-layer application to adjust an attribute (for example, a size or a position) of a display element in the window. For example, when the foldable screen of the electronic device 100 is in a half-folded state (the included angle α between the screen A and the screen B is within a range of 80 degrees to 100 degrees), the electronic device 100 may display, on the screen A or the screen B, a display interface of a foreground application for starting a camera.

In some embodiments, the electronic device 100 may have a plurality of physical screens. For example, as shown in (d) in FIG. 3, the electronic device 100 includes the foldable screen and the screen C. The foldable screen is folded into the screen A and the screen B, and the screen C is on the back of the screen A.

Figure 7B:
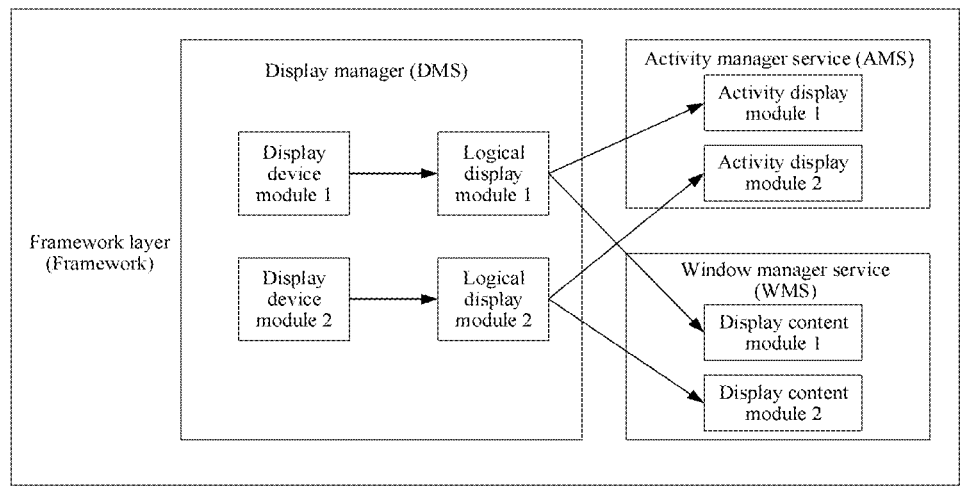
FIG. 7B is a schematic diagram of a software architecture of another electronic device according to an embodiment of this application.

As shown in FIG. 7B, in the multi-screen display scenario, the framework layer in the software structure of the electronic device 100 may include display device (display device) information corresponding to each physical screen. For example, the foldable screen corresponds to a display device module 1. The display device module 1 is configured to describe physical screen information of the foldable screen. The physical screen information includes resolution, dots per inch (dots per inch, DPI), and the like. The screen C corresponds to a display device module 2. The display device module 2 is configured to describe physical screen information of the screen C. Each physical screen of the electronic device 100 further corresponds to a logical display (logical display) module. The logical module is configured to describe logical display information of a physical screen. For example, the foldable screen of the electronic device 100 corresponds to a logical display module 1, and the screen C corresponds to a logical display module 2. Each logical display module may derive an active display module and a display content module. For example, the logical display module 1 may derive an active display module 1 and a display content module 1, and the logical display module 2 may derive an active display module 2 and a display content module 2. An activity manager service (activity manager service, AMS) and a window manager service (WMS) may manage display logic of all upper-layer applications based on the foregoing activity display module and display content module. The electronic device 100 may start and display different activities on different logical display modules. For example, when a foreground application displayed on the foldable screen enables automatic countdown photographing, the electronic device 100 may synchronously enable the screen C on the back of the foldable screen to display the countdown.

In some embodiments, the framework layer on the electronic device 100 may implement an architecture in which a physical display device (display device) is separated from a logical display (logical display) layer. The logical display layer includes specific display content on a screen, and the physical display device (for example, the foldable screen) is configured to display all or a part of the display content at the logical display layer. A mapping relationship between display content and a display area on a physical display device may be set at the framework layer of the electronic device 100. For example, by using the architecture in which the physical display device is separated from the logical display layer, when the foldable screen is in a half-folded state, the electronic device 100 may separately display different interfaces of a same application on the screen A and the screen B.

Figure 7C:
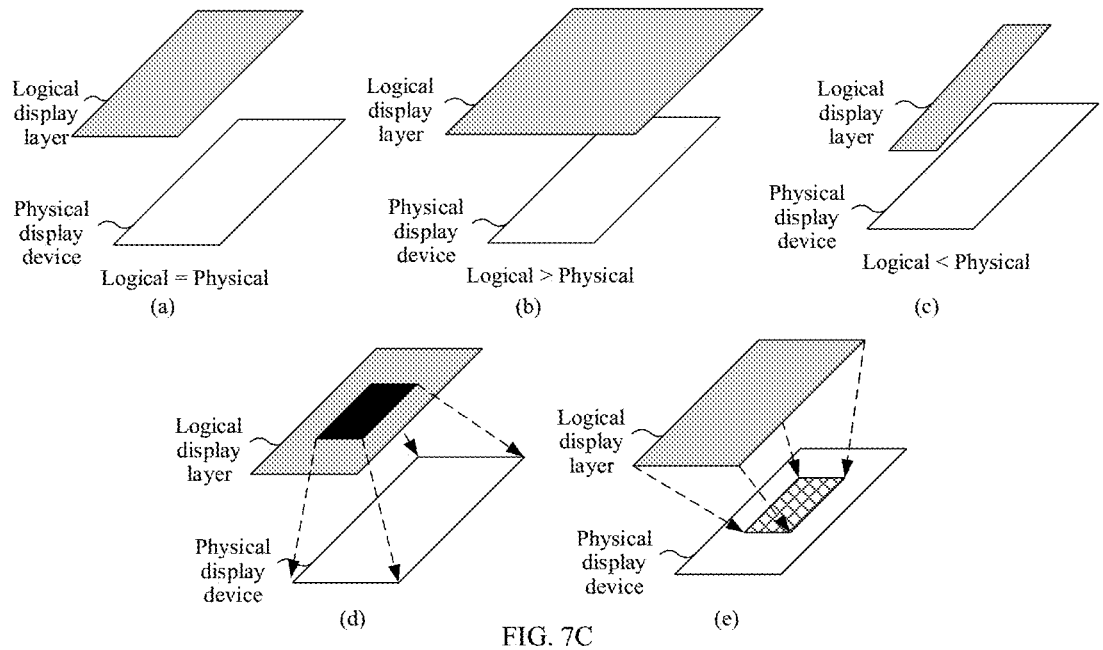
FIG. 7C is a schematic diagram of a relationship between a logical display layer and a physical display device according to an embodiment of this application.

As shown in FIG. 7C, in (a) in FIG. 7C, a size of a logical display layer is the same as a size of a physical display device. In (b) in FIG. 7C, a size of a logical display layer is greater than a size of a physical display device. In (c) in FIG. 7C, a size of a logical display layer is less than a size of a physical display device. In (d) in FIG. 7C, the electronic device 100 may display a part of the display content at the logical display layer on all areas of the physical display device (for example, the foldable screen). In (e) in FIG. 7C, the electronic device 100 may display all content at the logical display layer on a part of the areas of the physical display device (for example, the foldable screen).

With reference to an application scenario, the following specifically describes a display method for a foldable screen according to an embodiment of this application.

When the foldable screen of the electronic device 100 is in a fully folded state, an included angle (that is, a folding angle) a between the screen A and the screen B of the electronic device 100 meets: $\alpha \in [0°, P1]$. When the foldable screen is in an expanded state, an included angle (that is, a folding angle) a between the screen A and the screen B of the electronic device 100 meets: $\alpha \in [P2, 180°]$. When the foldable screen of the electronic device 100 is in a half-folded state, an included angle (that is, a folding angle) a between the screen A and the screen B of the electronic device 100 meets: $\alpha \in (P1, P2)$. Herein, $0° < P1 < P2 < 180°$.

In a possible implementation, when the included angle α between the screen A and the screen B of the electronic device 100 meets: $\alpha \in (P1, P2)$, and the included angle remains for a time period longer than a preset time period (for example, 0.6 seconds), the electronic device 100 may determine that the foldable screen enters the half-folded state.

In some application scenarios, when the foldable screen of the electronic device 100 is in the half-folded state, if a foreground application (for example, a Camera application, or a WeChat application) that is run on the electronic device 100 and that supports window display adaptation starts a camera, the electronic device 100 may display an application interface of the foreground application on the screen A or the screen B of the foldable screen. In this way, a user can conveniently perform photographing, video calling, live broadcasting, or the like without holding the electronic device 100 steady with both hands.

Figures 8A, 8B:
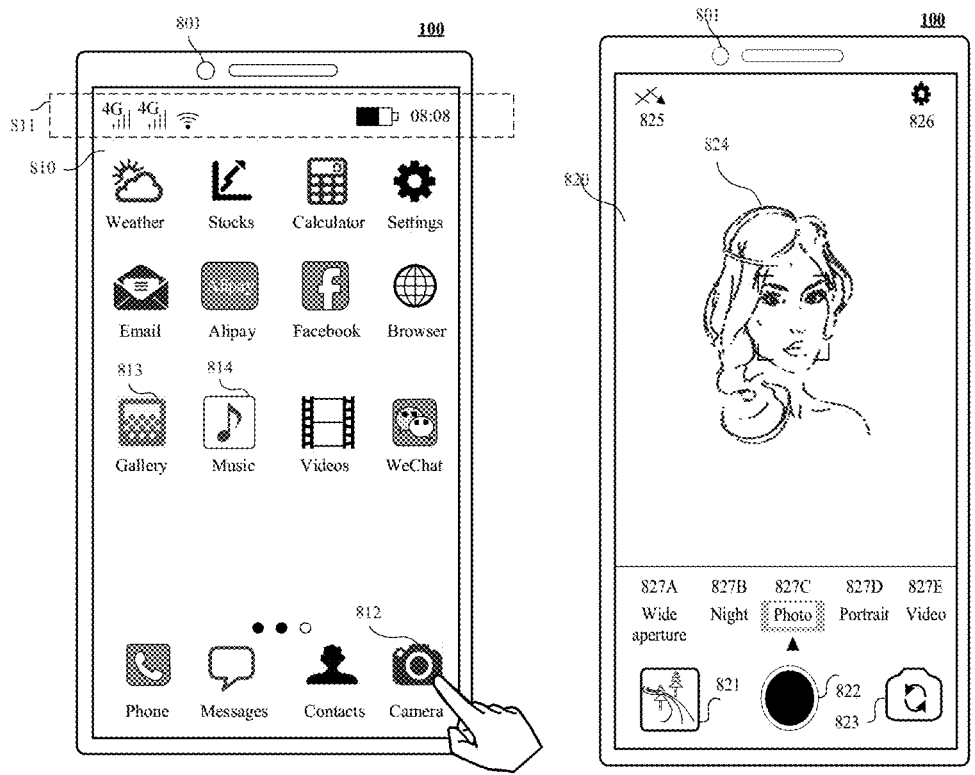
FIG. 8A to FIG. 8D are schematic diagrams of a group of interfaces according to an embodiment of this application.

For example, as shown in FIG. 8A, the foldable screen of the electronic device 100 is in an expanded state, and a front-facing camera 801 of the electronic device 100 is in a same direction as a display direction of the foldable screen. The electronic device 100 may display a home screen 810 in full screen on the foldable screen. The home screen 810 displays a page on which application icons are placed, and the page includes a plurality of application icons (for example, a Weather application icon, a Stocks application icon, a Calculator application icon, a Settings application icon, an Email application icon, an Alipay application icon, a Facebook application icon, a WeChat application icon, a Gallery application icon 813, a Music application icon 814, a Videos application icon, and an Browser application icon). A page indicator is further displayed below the plurality of application icons, to indicate a location relationship between the currently displayed page and another page. A plurality of tray icons (for example, a Phone application icon, a Messages application icon, a Contacts application icon, and a Camera application icon 812) are below the page indicator. The tray icons remain displayed when the page is switched. In some embodiments, the page may alternatively include a plurality of application icons and a page indicator. The page indicator may not be a part of the page and may exist independently, and the tray icon is also optional. This is not limited in this embodiment of this application. A status bar 811 may be further displayed in an upper part of the home screen 810. The status bar 811 may include one or more signal strength indicators of a mobile communication signal (which is also referred to as a cellular signal), a battery status indicator, a time indicator, and the like.

The electronic device 100 may receive an input operation (for example, tapping) of the user on the Camera application icon 812. In response to the input operation, the electronic device 100 may enable the camera, and display a Camera application interface 820 shown in FIG. 8B.

As shown in FIG. 8B, the Camera application interface 820 may display a photographed image echo control 821, a photographing control 822, a camera switch control 823, an image 824 captured by the camera, a flash control 825, a setting control 826, and one or more photographing mode controls (for example, a "Wide aperture mode" control 827A, a "Night mode" control 827B, a "Normal photographing mode" control 827C, a "Portrait mode" control 827D, and a "Video mode" control 827E). The photographed image echo control 821 may be configured to display a photographed image. The photographing control 822 may be configured to trigger saving of an image photographed by the camera. The camera switch control 823 may be configured to switch between cameras for photographing. The flash control 825 may be configured to turn on or turn off a flash. The setting control 826 may be configured to set a photographing function. The photographing mode control may be used to trigger enabling of an image processing procedure corresponding to the photographing mode. For example, the "Night mode" control 827B may be configured to trigger increasing of brightness, color richness, and the like in the photographed image. The "Portrait mode" control 827D may be configured to trigger blurring of a background of a person in the photographed image.

When the electronic device 100 detects that the foldable screen changes from an expanded state to a half-folded state and the camera is enabled on the Camera application interface, the electronic device 100 may display the Camera application interface on the screen A or the screen B. The electronic device 100 may display the Camera application interface on a preset half screen of the screen A and the screen B according to a preset display rule. For example, the electronic device 100 may receive a user input, and it is preset that when the foldable screen is in the half-folded state, an application interface of a foreground application for starting the camera is displayed on the screen A.

Figure 8C:
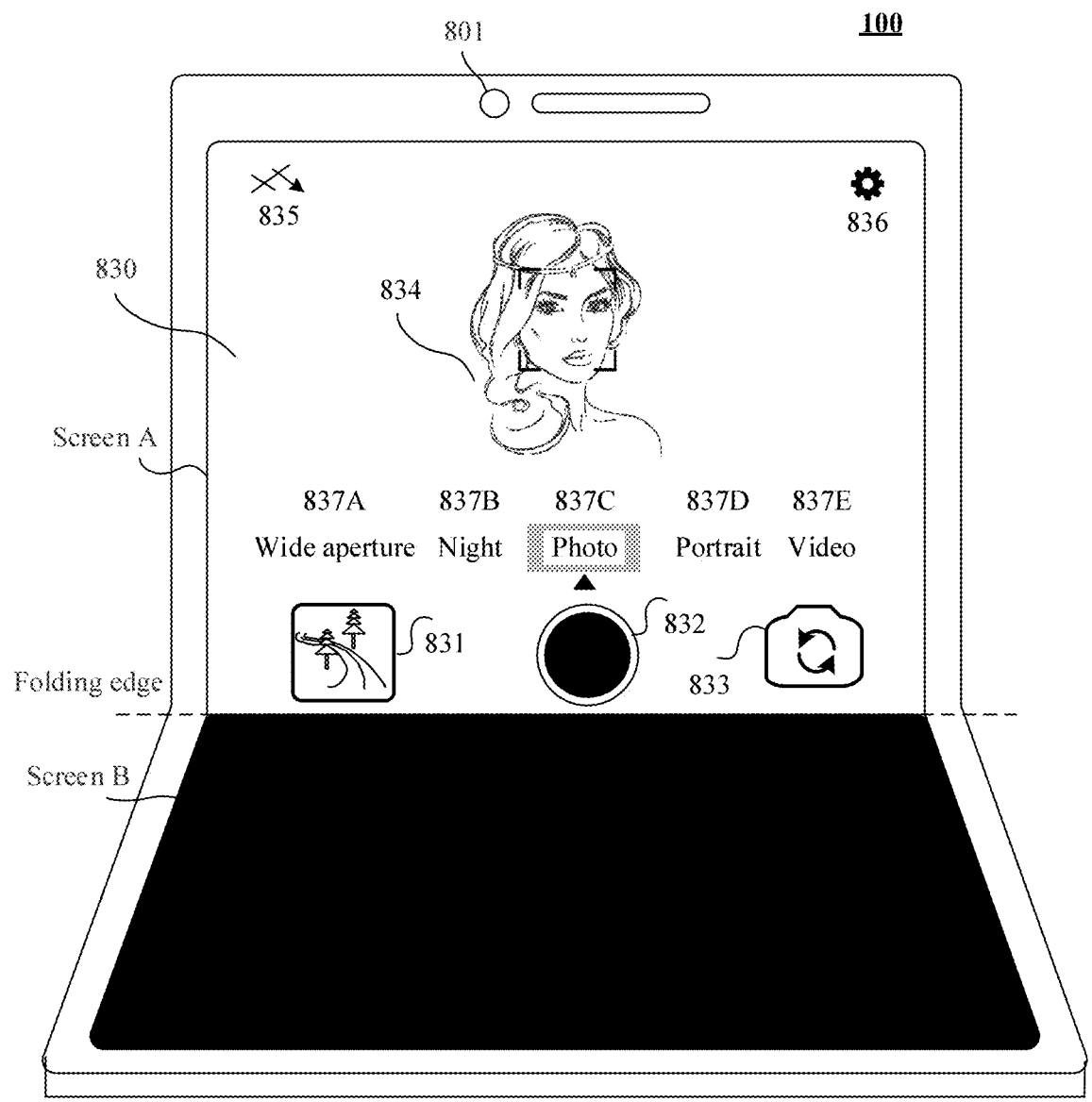

For example, as shown in FIG. 8C, when the electronic device 100 detects that the foldable screen changes from an expanded state to a half-folded state, the electronic device 100 may display a Camera application interface 830 on the screen A, and turn off the screen B. The Camera application interface 830 may include a photographed image echo control 831, a photographing control 832, a camera switch control 833, an image 834 captured by the camera, a flash control 835, a setting control 836, and one or more photographing mode controls (for example, a "Wide aperture mode" control 837A, a "Night mode" control 837B, a "Normal photographing mode" control 837C, a "Portrait mode" control 837D, and a "Video mode" control 837E). Interface elements in the Camera application interface 830 are the same as interface elements in the Camera application interface 820 shown in FIG. 8B. Therefore, for descriptions of the Camera application interface 830, refer to the text descriptions of the Camera application interface 820 in the embodiment shown in FIG. 8B. Details are not described herein again. A display ratio of the Camera application interface 830 is different from a display ratio of the Camera application interface 820, and a display ratio of the interface elements in the Camera application interface 830 may also be different from a display ratio of the interface elements in the Camera application interface 820.

In a possible implementation, when the foldable screen of the electronic device 100 is in a half-folded state, the electronic device 100 may further detect an included angle β1 between a plane on which the screen A is located and a horizontal plane. When the plane on which the screen A is located is nearly parallel to the horizontal plane (that is, the included angle β1 is less than a preset angle threshold P3 (for example, 10 degrees)), the electronic device 100 may switch to display, on the screen B, the Camera application interface displayed on the screen A. P3 ∈(0°, 45°). In this way, when photographing the sky or photographing the ground in a high building, the user does not need to look up to be dazzled by the sun or look down, and the electronic device 100 automatically displays, on a half screen (for example, the screen B) that is nearly vertical to the horizontal plane, an upper-layer application interface for starting the camera, to facilitate photographing of the user.

Figure 8D:
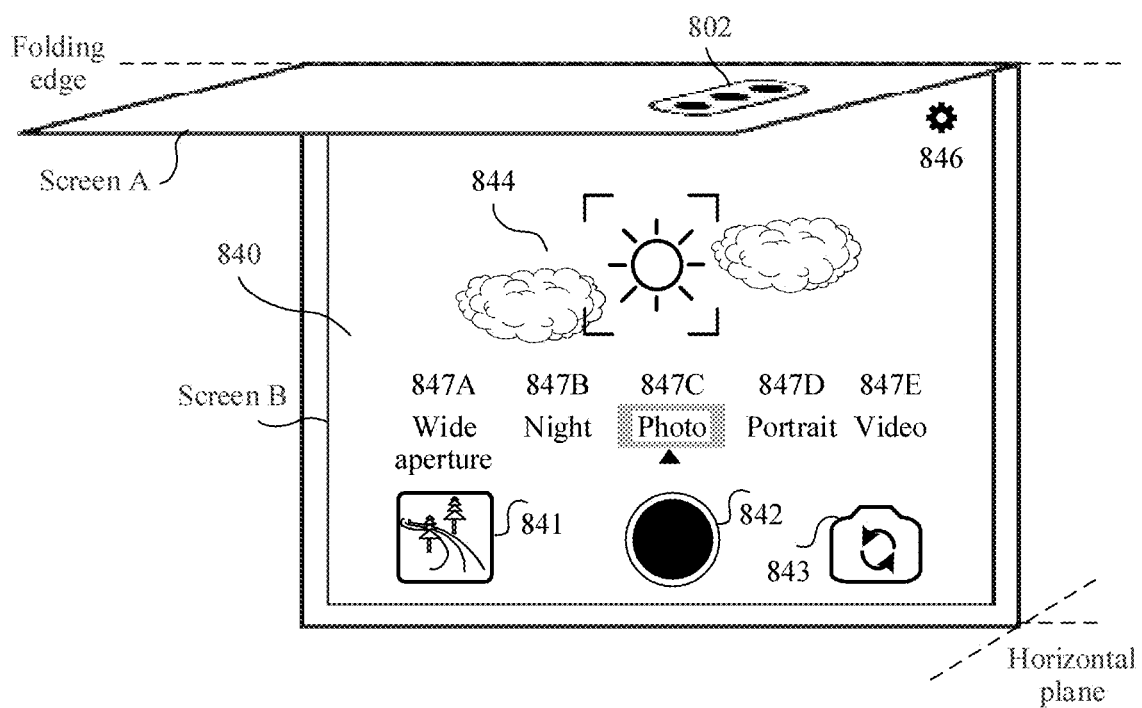

For example, as shown in FIG. 8D, the foldable screen of the electronic device 100 is in a half-folded state, and the electronic device 100 may start, by using a Camera application, a rear-facing camera 802 on the back of the screen A to photograph the sky. A plane on which the screen A is located is horizontal to the horizontal plane (for example, an included angle β1 between the plane on which the screen A is located and the horizontal plane is 5 degrees), and a plane on which the screen B is located is nearly perpendicular to the horizontal plane (for example, an included angle β2 between the plane on which the screen B is located and the horizontal plane is 93 degrees). The electronic device 100 may display a Camera application interface 840 on the screen B, and turn off the screen A. The Camera application interface 840 may display a photographed image echo control 841, a photographing control 842, a camera switch control 843, an image 844 captured by the camera, a flash control (not shown in FIG. 8D), a setting control 846, and one or more photographing mode controls (for example, a "Wide aperture mode" control 847A, a "Night mode" control 847B, a "Normal photographing mode" control 847C, a "Portrait mode" control 847D, and a "Video mode" control 847E). Interface elements in the Camera application interface 840 are the same as interface elements in the Camera application interface 820 shown in FIG. 8B. Therefore, for descriptions of the Camera application interface 840, refer to the text descriptions of the Camera application interface 820 in the embodiment shown in FIG. 8B. Details are not described herein again. A display ratio of the Camera application interface 830 is different from a display ratio of the Camera application interface 820, and a display ratio of the interface elements in the Camera application interface 830 may also be different from a display ratio of the interface elements in the Camera application interface 820.

In a possible implementation, when the foldable screen of the electronic device 100 is in a half-folded state, the electronic device 100 may further detect an included angle β1 between a plane on which the screen A is located and a horizontal plane. When the plane on which the screen A is located is nearly parallel to the horizontal plane (that is, the included angle β1 is between the preset angle threshold P3 and a preset angle threshold P4, for example, the included angle β1 may be 93 degrees), the electronic device 100 may switch to display, on the screen A, the Camera application interface displayed on the screen B. P4 ∈(90°, 135°). In this way, when the foldable screen is in the half-folded state, and the electronic device 100 performs photographing in a horizontal direction, an application interface of a foreground application for starting a camera may be displayed only on a half screen that is nearly perpendicular to the horizontal plane, so that the user can perform photographing, video calling, and live broadcasting without holding the electronic device steady with both hands.

In some application scenarios, there may be a screen on the back of the foldable screen of the electronic device 100, for example, the screen C shown in (d) in FIG. 3. The screen C is on a same side as the rear-facing camera. When the foldable screen is in the half-folded state or the fully folded state, the screen C may be opposite to the screen A. When the electronic device 100 is in the half-folded state, and the foreground application (for example, a Camera application, or a WeChat application) enables the camera to perform countdown photographing, the electronic device 100 may display a photographing countdown on the screen C. In this way, when the owner leaves the electronic device and performs automatic countdown photographing together with another person, the countdown may be displayed on the screen C, which is convenient for the user to make a photographing posture, thereby improving user experience.

Figure 9A:
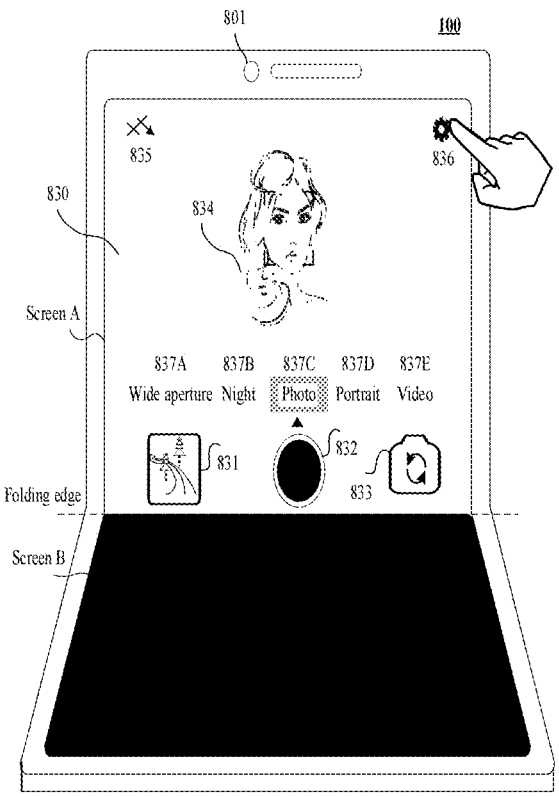
FIG. 9A to FIG. 9G are schematic diagrams of another group of interfaces according to an embodiment of this application.

For example, as shown in FIG. 9A, the electronic device 100 is in the half-folded state. The electronic device 100 starts the camera by using a Camera application, displays the Camera application interface 830 on the screen A, and turns off the screen B. The Camera application interface 830 includes the image 834 captured by the camera. For text descriptions of the Camera application interface 830, refer to the embodiment shown in FIG. 9A. Details are not described herein again.

The electronic device 100 may receive an input operation (for example, tapping) of the user on the setting control 836. In response to the input operation, the electronic device 100 may display, on the screen A, a settings interface 910 shown in FIG. 9B.

Figure 9B:
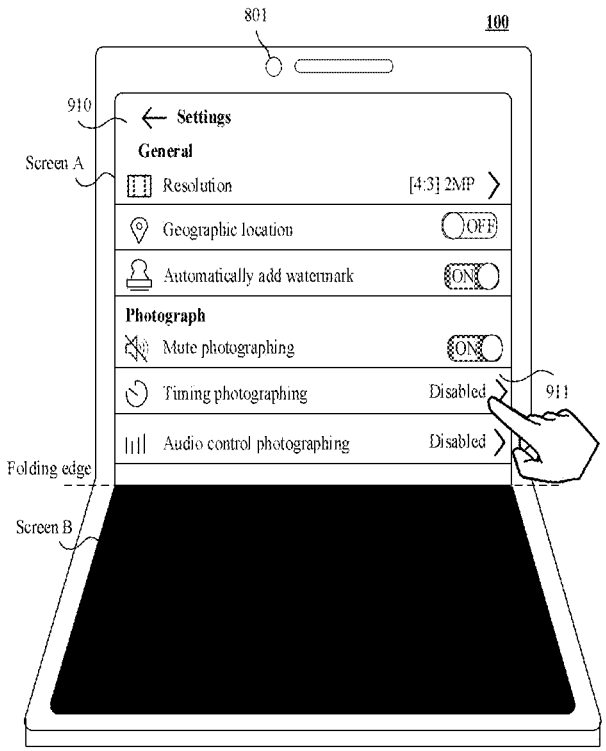

As shown in FIG. 9B, the settings interface 910 may include one or more setting entries (for example, a resolution setting entry, a geographic location setting entry, a watermark setting entry, a photographing mute setting entry, a timing photographing setting entry 911, and a sound control photographing setting entry). Currently, a timing photographing function of the electronic device 100 is in a disabled state, and the timing photographing setting entry may be used to: receive an input operation of the user, enable the timing photographing function, and set a timing period.

The electronic device 100 may receive an input operation (for example, tapping) of the user on the timing photographing setting entry 911. In response to the input operation, the electronic device 100 may display, on the screen A, a timing photographing setting window 920 shown in FIG. 9C.

Figure 9C:
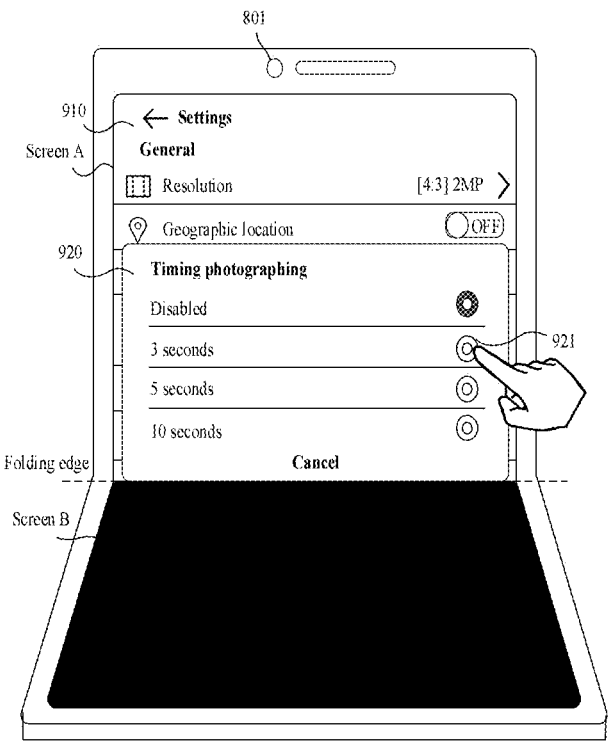

As shown in FIG. 9C, the timing photographing setting window 920 may display one or more setting options (for example, a disable option, a 3-second timing option 921, a 5-second timing option, and a 10-second timing option). The electronic device 100 may receive an input operation (for example, tapping) of the user on the 3-second timing option 921. In response to the input operation, the electronic device 100 may enable the timing photographing function, and set a timing period to 3 seconds.

Figures 9D, 9E:
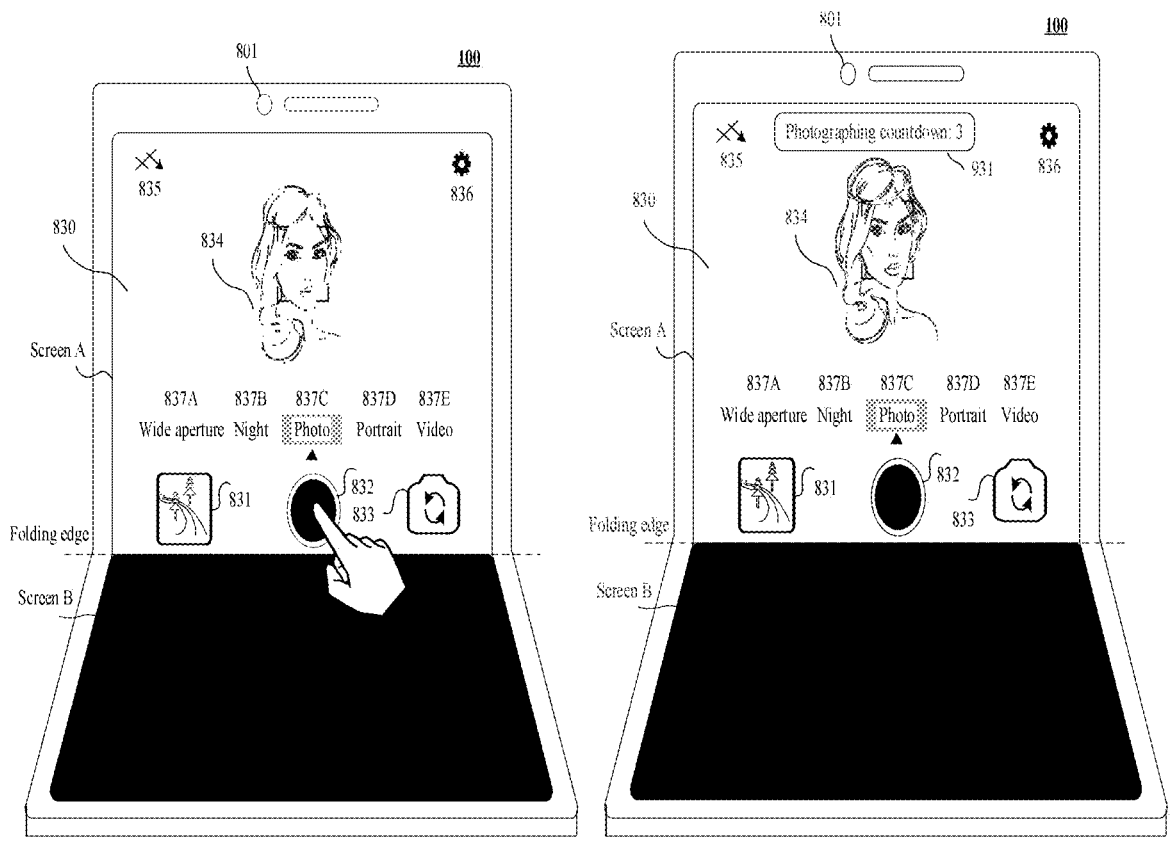

As shown in FIG. 9D, after the electronic device 100 sets the timing period of the timing photographing function to 3 seconds, the electronic device 100 may receive an input operation (for example, tapping) of the user on the photographing control 832 in the Camera application interface 830. In response to the input operation (for example, tapping), the electronic device 100 may display, on the screen A, a photographing countdown prompt 931 shown in FIG.

Figure 9F:
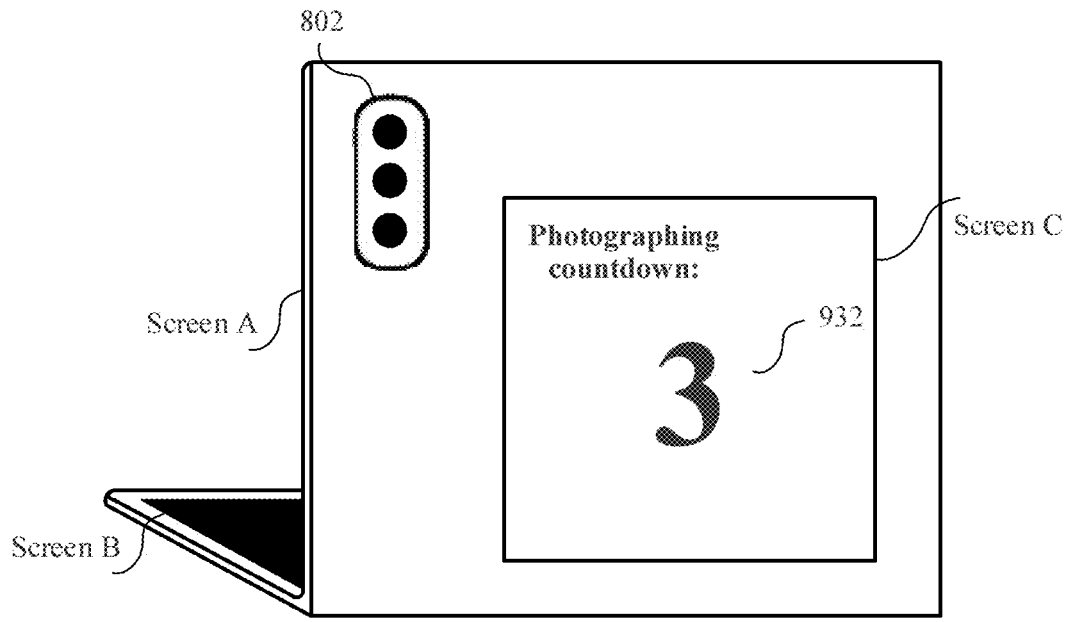

9E, and display, on the screen C on the back of the screen A, a countdown prompt 932 shown in FIG. 9F.

As shown in FIG. 9E, the photographing countdown prompt 931 may be used to prompt the user of remaining time for the electronic device 100 to store the image captured by the camera. For example, current remaining time is 3 seconds. When the remaining time is 0 seconds, the electronic device 100 may locally store the image captured by the camera as a photographed image, and display a thumbnail of the image on the photographed image echo control 826. The user may further open a Gallery application of the electronic device 100 to view an image captured by the electronic device 100.

As shown in FIG. 9F, in response to the input operation of the user on the photographing control 832 in FIG. 9D, the electronic device 100 may display the photographing countdown prompt 932 on the screen C. The photographing countdown prompt 932 may be used to prompt the user of the remaining time for the electronic device 100 to store the image captured by the camera.

In a possible implementation, the foldable screen of the electronic device 100 is in the half-folded state, and if the foreground application (for example, the Camera application, or the WeChat application) of the electronic device 100 enables the countdown photographing function, the electronic device 100 may determine whether the foreground application starts the front-facing camera 801 or the rear-facing camera 802. If the foreground application starts the front-facing camera 801, the electronic device 100 may display the photographing countdown on the screen A in response to a photographing operation of the user (for example, the input operation of the user on the photographing control 832 in FIG. 9D). If the foreground application starts the rear-facing camera 802, the electronic device 100 may display the photographing countdown on both the screen A and the screen C. In this way, when the user enables the front-facing camera to take a selfie, the photographing countdown may be displayed only on the screen A, to prevent another person from knowing that the user is taking a selfie, thereby protecting user privacy.

In a possible implementation, the foldable screen of the electronic device 100 is in the half-folded state. When the foreground application of the electronic device 100 starts the rear-facing camera 802, and performs countdown photographing, the electronic device 100 may display, on the screen A and the screen C, a photographing countdown prompt and an image captured by the rear-facing camera 802. In this way, a person who is photographed behind can see a countdown number, and prepare for a pose and an expression before photographing.

Figure 9G:
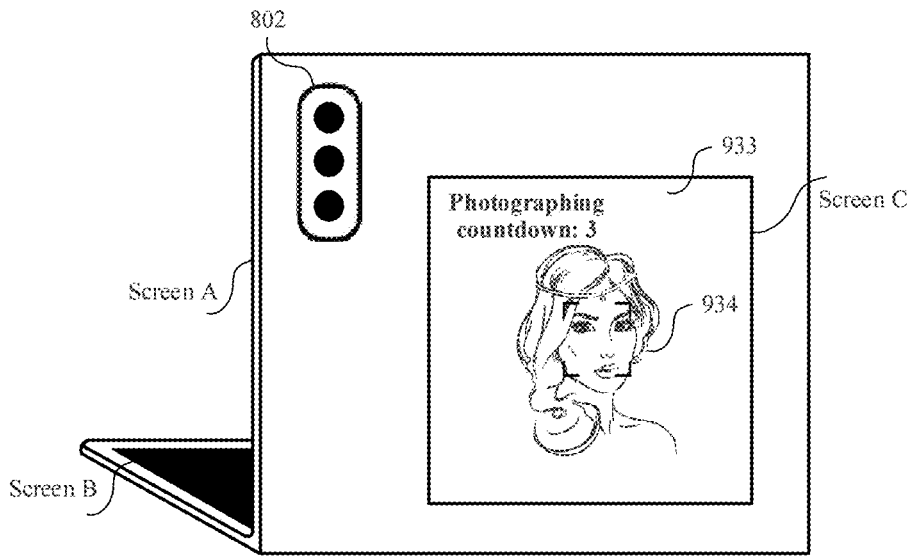

For example, as shown in FIG. 9G, the electronic device 100 may display, on the screen C, a photographing countdown prompt 933 and an image 934 captured by the rear-facing camera 802.

In some application scenarios, when the foldable screen of the electronic device 100 is in an expanded state, the electronic device 100 may display an application interface of a foreground application (for example, a Gallery application). After the foldable screen of the electronic device 100 changes to a half-folded state, the electronic device 100 may start an associated application (for example, a Camera application) or a shortcut application (for example, a Music application) of the foreground application, display the application interface of the foreground application on one half screen of the screen A and the screen B, and display the associated application or the shortcut application on the other half screen of the screen A and the screen B. For example, the electronic device 100 may display the application interface of the foreground application on the screen A, and display an application interface of the associated application or an application interface of the shortcut application on the screen B. The user may preset the associated application for the foreground application on the electronic device 100, and may further preset the shortcut application. For example, the user may preset an associated application for the Gallery application on the electronic device 100 as the Camera application, and set the shortcut application as the Music application. In this way, a plurality of application tasks can be automatically started when the electronic device 100 is in the half-folded state, so that the user can simultaneously process the plurality of application tasks.

In a possible implementation, the foreground application running on the electronic device 100 has only one associated application. When the electronic device 100 detects that the foldable screen is in the half-folded state, the electronic device 100 may display the foreground application on the screen A, and display the application interface of the associated application on the screen B. Alternatively, the electronic device 100 displays the foreground application on the screen B, and displays the application interface of the associated application on the screen A.

Figures 10A, 10B:
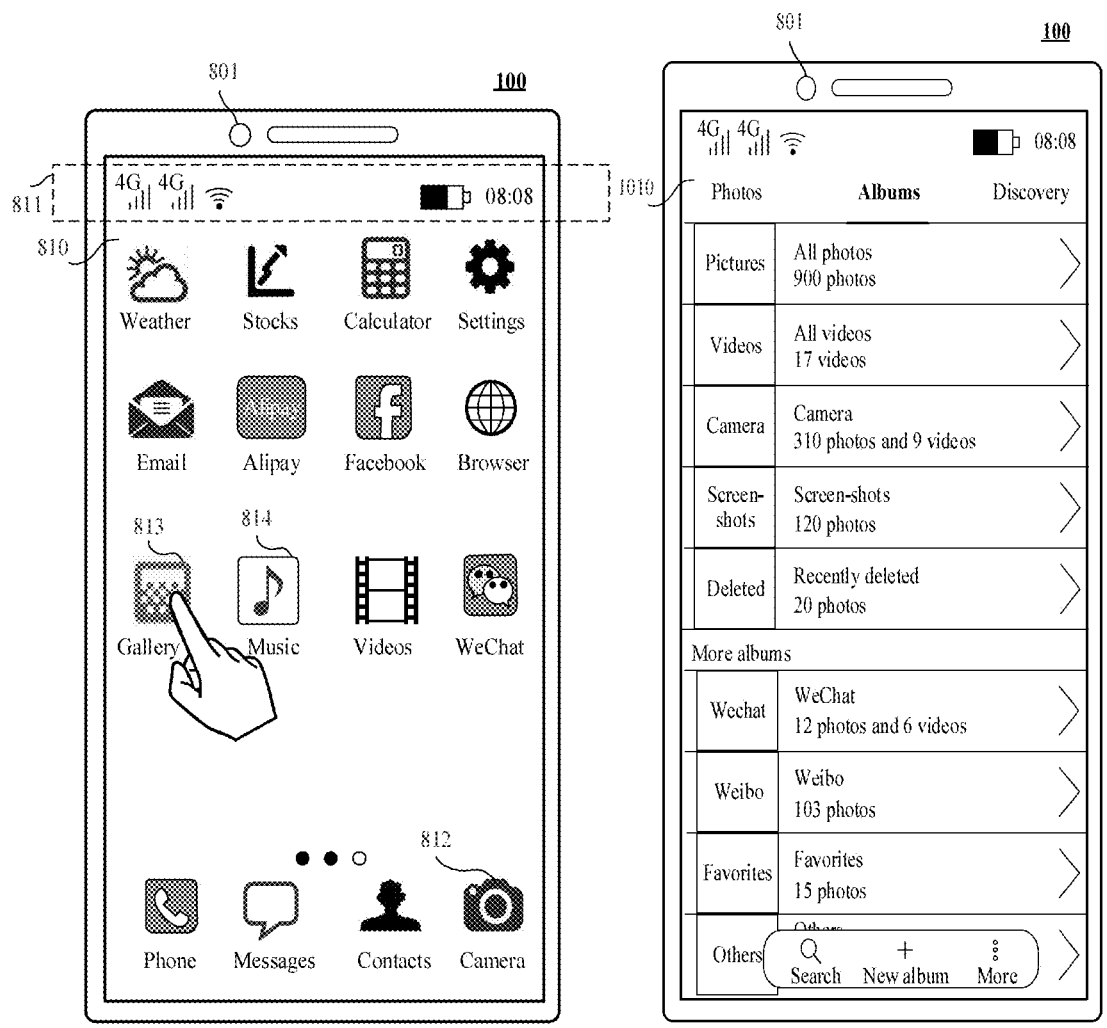
FIG. 10A to FIG. 10D are schematic diagrams of another group of interfaces according to an embodiment of this application.

For example, as shown in FIG. 10A, the electronic device 100 is in the expanded state, and the electronic device 100 displays the home screen 810. For text descriptions of the home screen 810, refer to the embodiment shown in FIG. 8A. Details are not described herein again. The electronic device 100 may receive an input operation (for example, tapping) of the user on the Gallery application icon 813. In response to the input operation, the electronic device 100 may display a Gallery application interface 1010 shown in FIG. 10B.

As shown in FIG. 10B, the Gallery application interface 1010 may display one or more albums (for example, an all photos album, an all videos album, a camera album, a screen-shots album, a recently deleted album, a WeChat album, a Weibo album, and an others album).

An associated application of the Gallery application may be the Camera application. When the electronic device 100 detects that the foldable screen changes from the expanded state shown in FIG. 10B to the half-folded state, the electronic device 100 may display the application interface of the Gallery application on the screen A, and display the application interface of the Camera application on the screen B.

Figure 10C:
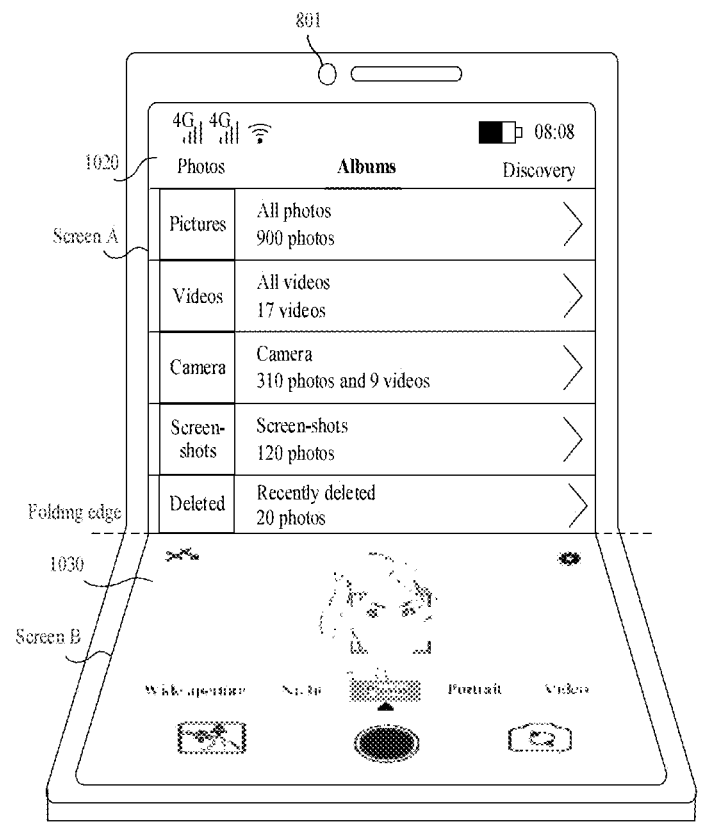

As shown in FIG. 10C, when the electronic device 100 detects that the foldable screen changes from the expanded state shown in FIG. 10B to the half-folded state, the electronic device 100 may display a Gallery application interface 1020 on the screen A, and display the Camera application interface on the screen B. Compared with the Gallery application interface 1010 shown in FIG. 10B, the Gallery application interface 1020 has less display content and a smaller display ratio.

In a possible implementation, when the electronic device 100 detects that the foldable screen changes from the expanded state to the half-folded state, if there is an associated application of the foreground application, and there is a Camera application in the foreground application and the associated application, the electronic device 100 may determine whether a plane on which the screen A is located is nearly parallel to a horizontal plane (that is, an included angle β1 between the plane on which the screen A is located and the horizontal plane is less than a preset angle threshold P3 (for example, 10 degrees)). If the plane on which the screen A is located is nearly parallel to the horizontal plane, the electronic device 100 may display an application interface of the Camera application on the screen B, and display an application interface of another application in the foreground application and the associated application on the screen A. If the plane on which the screen A is located is not nearly parallel to the horizontal plane (that is, the included angle β1 between the plane on which the screen A is located and the horizontal plane is greater than or equal to the preset angle threshold P3 (for example, 10 degrees)), the electronic device 100 may display an application interface of the Camera application on the screen A, and display an application interface of another application in the foreground application and the associated application on the screen B.

Figure 10D:
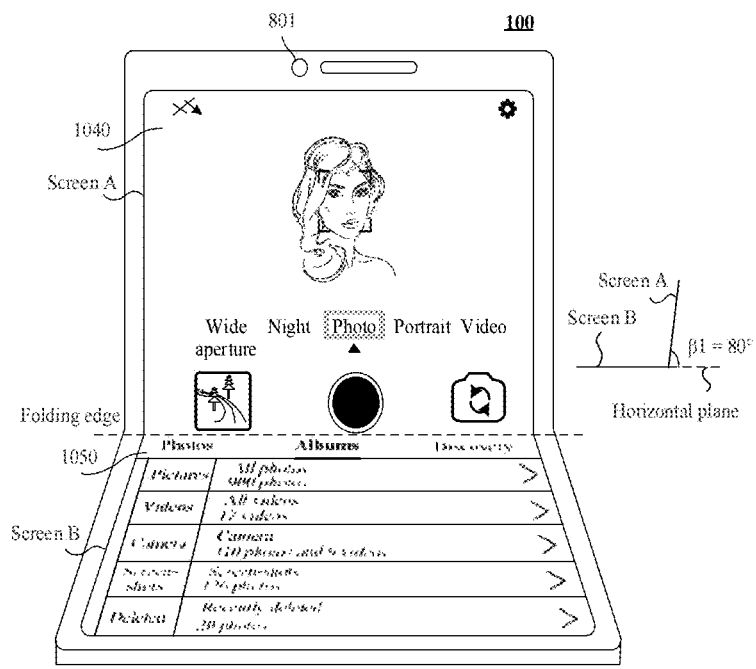

For example, as shown in FIG. 10D, an associated application of the Gallery application is the Camera application. When the electronic device 100 detects that the foldable screen changes from the expanded state to the half-folded state, and the plane on which the screen A is located is not nearly parallel to the horizontal plane (that is, the included angle β1 between the plane on which the screen A is located and the horizontal plane is greater than or equal to the preset angle threshold P3 (for example, 10 degrees)), the electronic device 100 may display a Camera application interface 1040 on the screen A, and display a Gallery application interface 1050 on the screen B. Compared with the Gallery application interface 1010 shown in FIG. 10B, the Gallery application interface 1050 has less display content and a smaller display ratio.

In a possible implementation, the foreground application running on the electronic device 100 may have a plurality of associated applications. When the foldable screen of the electronic device 100 is in the half-folded state, the electronic device 100 may display the application interface of the foreground application (for example, the Gallery application) on the screen A, and display icons of a plurality of associated applications (for example, a Camera application, a Music application, a Videos application, and a WeChat application) on the screen B. Then, when the electronic device 100 receives a user input and selects a specified associated application from the plurality of associated applications, the electronic device 100 may respectively display the application interface of the foreground application (for example, the Camera application) and an application interface of the specified associated application on the screen A and the screen B.

Figure 11A:
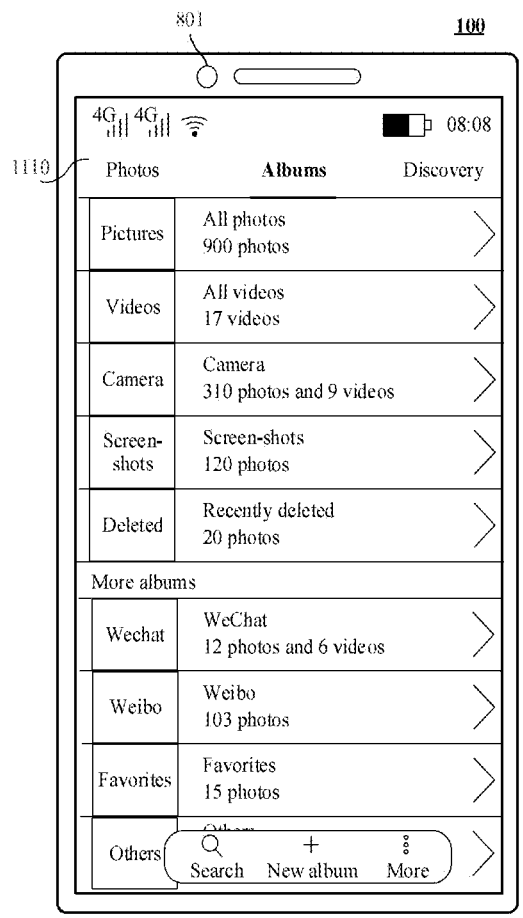
FIG. 11A to FIG. 11C are schematic diagrams of another group of interfaces according to an embodiment of this application.

For example, as shown in FIG. 11A, the electronic device 100 is in the expanded state, and the electronic device 100 displays a Gallery application interface 1110. For text descriptions of the Gallery application interface 1110, refer to the embodiment shown in FIG. 10B. Details are not described herein again.

Associated applications of the Gallery application include a Camera application, a Music application, a Videos application, a WeChat application, and the like. When the electronic device 100 detects that the foldable screen changes from the expanded state shown in FIG. 11A to the half-folded state, the electronic device 100 may display the application interface of the Gallery application on the screen A, and display icons of a plurality of associated applications of the Gallery application on the screen B.

Figure 11B:
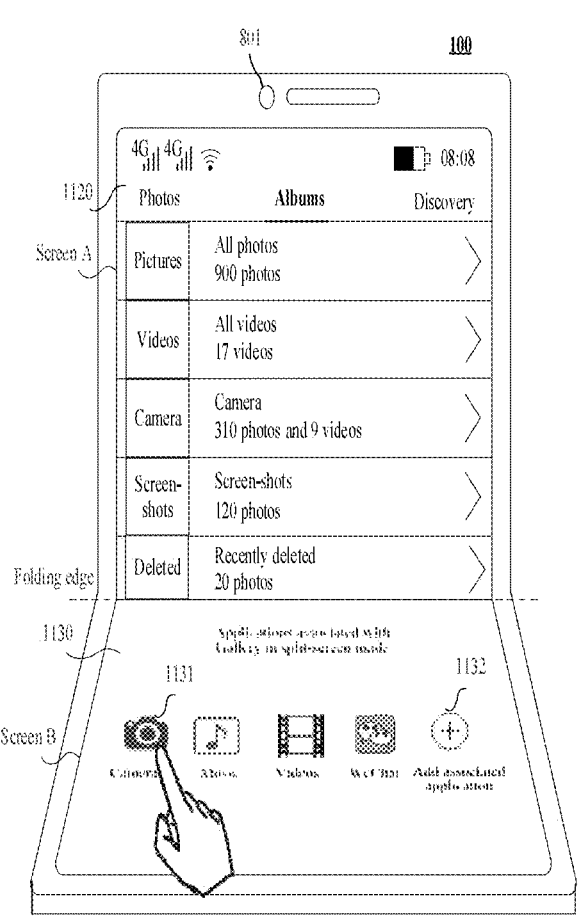

As shown in FIG. 11B, when the electronic device 100 detects that the foldable screen changes from the expanded state shown in FIG. 11A to the half-folded state, the electronic device 100 may display a Gallery application interface 1120 on the screen A, and display an associated application selection interface 1130 on the screen B. Compared with the Gallery application interface 1110 shown in FIG. 11A, the Gallery application interface 1120 has less display content and a smaller display ratio. The associated application selection interface 1130 displays the icons of the plurality of associated applications (for example, a Camera application icon 1131, a Music application icon, a Videos application icon, and a WeChat application icon). The associated application selection interface 1130 may further display an add control 1132. The add control 1132 may be used to add a new associated application to the Gallery application.

Figure 11C:
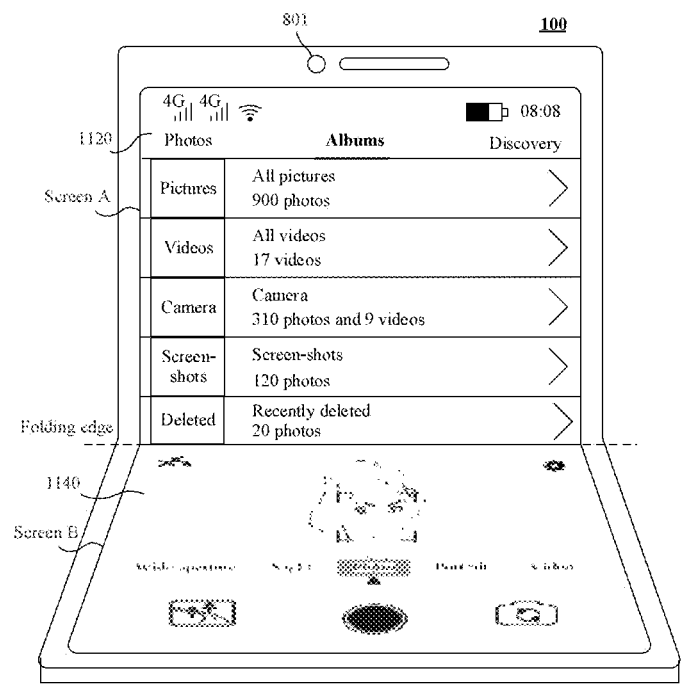

The electronic device 100 may receive an input operation (for example, tapping) of the user on the Camera application icon 1131 in the associated application selection interface 1130. In response to the input operation, the electronic device 100 may display, on the screen B, a Camera application interface 1140 shown in FIG. 11C. The Camera application interface 1140 is the same as the Camera application interface 1030 shown in FIG. 10C. Therefore, for text descriptions of the Camera application interface 1140, refer to the embodiment shown in FIG. 10C. Details are not described herein again.

In a possible implementation, the foldable screen of the electronic device 100 may display the application interface of the foreground application (for example, the Gallery application) in the expanded state. When the electronic device 100 detects that the foldable screen enters the folded state, the electronic device 100 may display an application interface of a shortcut application (for example, the Music application) on the screen A, and turn off the screen B.

Figure 12A:
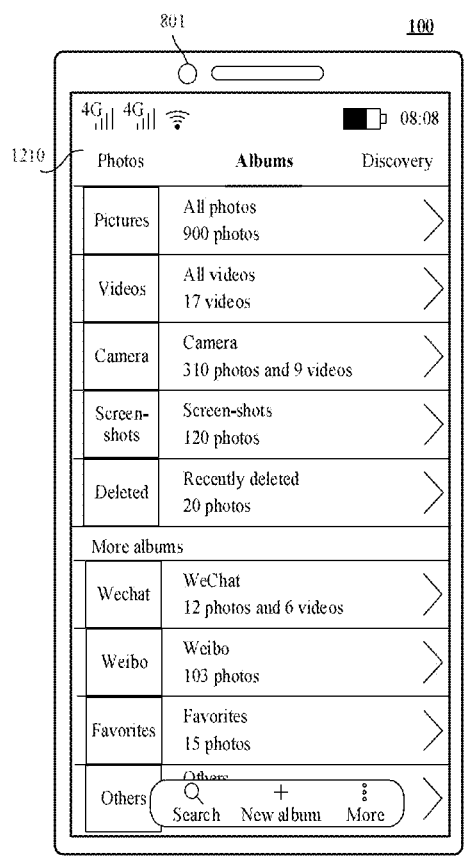
FIG. 12A to FIG. 12D are schematic diagrams of another group of interfaces according to an embodiment of this application.

For example, as shown in FIG. 12A, the electronic device 100 is in the expanded state, and the electronic device 100 displays a Gallery application interface 1210. For text descriptions of the Gallery application interface 1210, refer to the embodiment shown in FIG. 10B. Details are not described herein again. The shortcut application preset on the electronic device 100 may be the Music application.

Figure 12B:
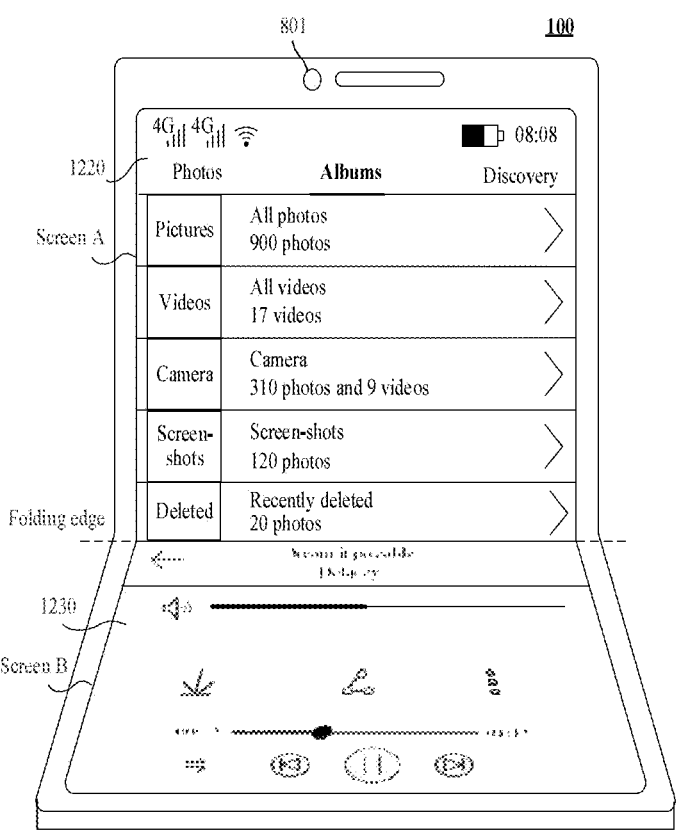

As shown in FIG. 12B, when the electronic device 100 detects that the foldable screen changes from the expanded state shown in FIG. 12A to the half-folded state, the electronic device 100 may display a Music application interface 1230 on the screen A, and turn off the screen B.

In a possible implementation, the foldable screen of the electronic device 100 may display the application interface of the foreground application (for example, the Gallery application) in the expanded state. When the electronic device 100 detects that the foldable screen enters the folded state, the electronic device 100 may display the application interface of the foreground application on one half of the screen A and the screen B, and display the application interface of the shortcut application (for example, the Music application) on the other half of the screen A and the screen B.

For example, as shown in FIG. 12B, when the electronic device 100 detects that the foldable screen changes from the expanded state shown in FIG. 12A to the half-folded state, the electronic device 100 may display a Gallery application interface 1220 on the screen A, and display a Music application interface 1230 on the screen B.

In a possible implementation, when the foldable screen of the electronic device 100 is in the half-folded state, the electronic device 100 may display an application interface of an application A on the screen A, display an application interface of an application B on the screen B, and display a switch control on the screen A or the screen B. The switch control may be used to trigger displaying of the application interface of the application A on the screen B, and displaying of the application interface of the application B on the screen A.

Figure 12C:
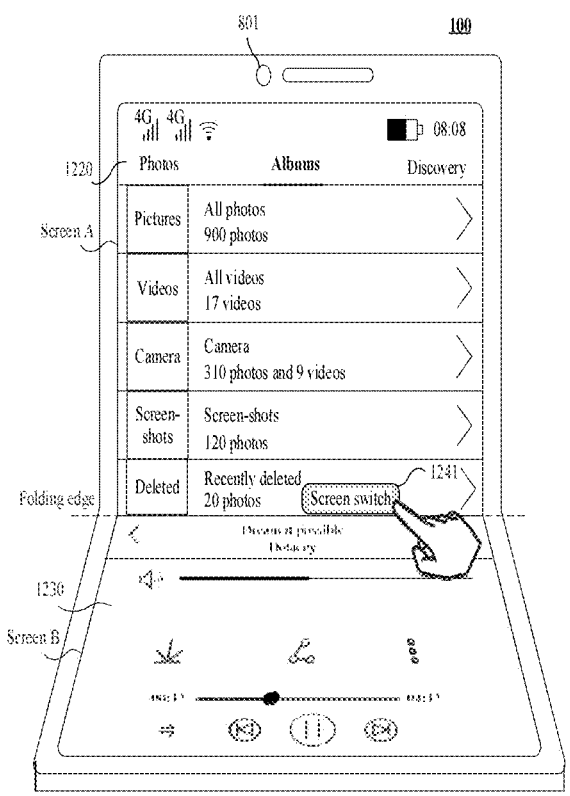

For example, as shown in FIG. 12C, the foldable screen of the electronic device 100 is in the half-folded state. The electronic device 100 may display the Gallery application interface 1220 on the screen A, display the Music application interface 1230 on the screen B, and display a switch control 1241 on the screen A. The switch control 1241 may be used to trigger switching between a display position of the Gallery application interface 1220 and a display position of the Music application interface 1230.

Figure 12D:
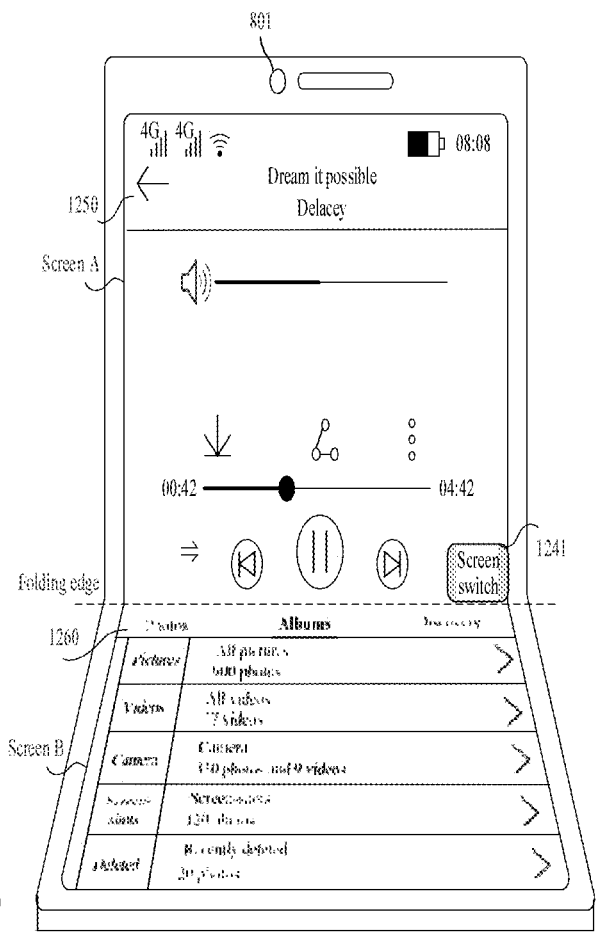

The electronic device 100 may receive an input operation (for example, tapping) of the user on the switch control 1241. In response to the input operation, as shown in FIG. 12D, the electronic device 100 may display a Music application interface 1250 on the screen A, and display a Gallery application interface 1260 on the screen B.

In some application scenarios, for some applications on the electronic device 100, a customized interface layout and a customized function control layout may be preset for the half-folded state of the foldable screen. When the foldable screen of the electronic device 100 is in the expanded state, the electronic device 100 may display an application interface 1 of a foreground application (for example, the Camera application). After the foldable screen of the electronic device 100 changes to the half-folded state, the electronic device 100 may display an interface 2 of the foreground application on the screen A, and display an interface 3 of the foreground application on the screen B. For example, when the foldable screen is in the half-folded state, the foreground application started by the electronic device 100 is the Camera application, and the electronic device 100 may display a photographing image on the screen A, and display a photographing-related function control on the screen B. In this way, controls in the application interface may be rearranged based on a physical state of the foldable screen, so that the user obtains better visual experience when viewing and using the foldable screen.

Figure 13A:
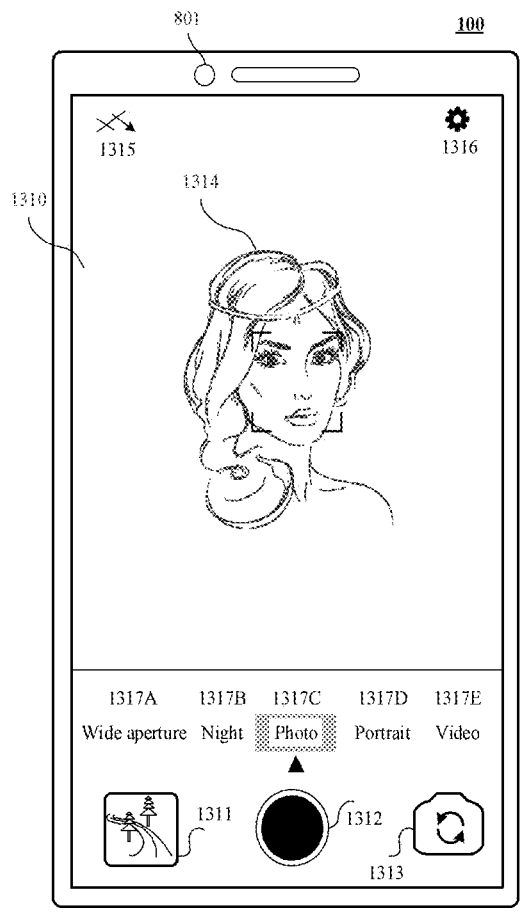

For example, as shown in FIG. 13A, the electronic device 100 is in the expanded state, and the electronic device 100 displays a Camera application interface 1310. The Camera application interface may display a photographed image echo control 1311, a photographing control 1312, a camera switch control 1313, an image 1314 captured by the camera, a flash control 1315, a setting control 1316, and one or more photographing mode controls (for example, a "Wide aperture mode" control 1317A, a "Night mode" control 1317B, a "Normal photographing mode" control 1317C, a "Portrait mode" control 1317D, and a "Video mode" control 1317E). The Camera application interface 1310 is the same as the Camera application interface 820 in the embodiment shown in FIG. 8B. Therefore, for text descriptions of the Camera application interface 1310, refer to the embodiment shown in FIG. 8B. Details are not described herein again.

Figure 13B:
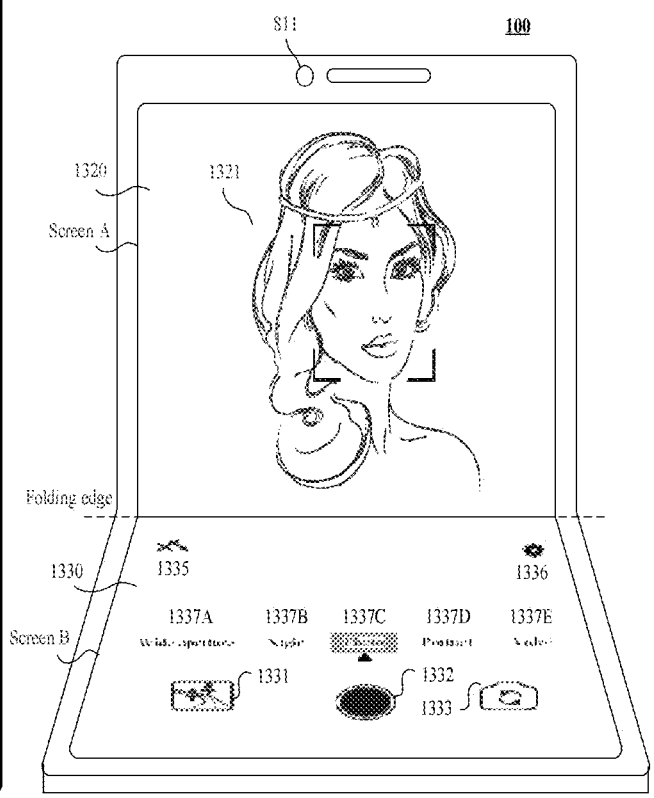

When the electronic device 100 detects that the foldable screen changes from the expanded state to the half-folded state, the electronic device 100 may display, on the screen A, a Camera application interface 1320 shown in FIG. 13B, and display, on the screen B, a Camera application interface 1330 shown in FIG. 13B.

As shown in FIG. 13B, the Camera application interface 1320 includes an image 1321 captured by the camera. The Camera application interface 1330 includes a photographed image echo control 1331, a photographing control 1332, a camera switch control 1333, a flash control 1335, a setting control 1336, and one or more photographing mode controls (for example, a "Wide aperture mode" control 1337A, a "Night mode" control 1337B, a "Normal photographing mode" control 1337C, a "Portrait mode" control 1337D, and a "Video mode" control 1337E). A function control included in the Camera application interface 1320 is the same as a function control included in the Camera application interface 1310 shown in FIG. 13A.

For another example, as shown in FIG. 13C, when the electronic device 100 detects that the foldable screen changes from the expanded state shown in FIG. 13A to the half-folded state, the electronic device 100 may display, on the screen A, a Camera application interface 1340 interface 1320 shown in FIG. 13C, and display a Camera application interface 1350 on the screen B. The Camera application interface 1320 includes an image 1321 captured by the camera. The Camera application interface 1340 includes a photographed image echo control 1341, a photographing control 1342, a camera switch control 1343, a beauty effect setting control 1344, a flash control 1345, a setting control 1346, a zoom magnification setting control 1348, an AI enhancement control 1349, and one or more photographing mode controls (for example, a "Wide aperture mode" control 1347A, a "Night mode" control 1347B, a "Normal photographing mode" control 1347C, a "Portrait mode" control 1347D, and a "Video mode" control 1347E). The function control included in the Camera application interface 1340 is different from the function control included in the Camera application interface 1320 shown in FIG. 13A.

The following describes a display method for a foldable screen according to an embodiment of this application.

FIG. 14 is a schematic flowchart of a display method for a foldable screen according to an embodiment of this application. The method is applied to an electronic device including a foldable screen. The foldable screen can be folded to form at least two screens, and the at least two screens includes a first screen and a second screen. As shown in FIG. 14, the method may include the following steps.

S1401: When the foldable screen is in an expanded state, the electronic device displays a first interface of a first application in full screen on the foldable screen, where the first interface includes an image captured by a camera. The image captured by the camera is an image captured before a photographing confirmation signal is received.

When the foldable screen is in the expanded state, an included angle between the first screen and the second screen is greater than a first angle threshold; and when the foldable screen is in a half-folded state, the included angle between the first screen and the second screen is between the first angle threshold and a second angle threshold. The first angle threshold is greater than the second angle threshold. Specifically, the foldable screen may be an inward foldable screen, or may be an outward foldable screen.

For example, the first angle threshold is P2, and the second angle threshold is P1. When the foldable screen of the electronic device 100 is in a fully folded state, an included angle (that is, a folding angle) a between a screen A and a screen B of the electronic device 100 meets: $\alpha \in [0°, P1]$. When the foldable screen is in the expanded state, the included angle (that is, the folding angle) a between the screen A and the screen B of the electronic device 100 meets: $\alpha \in [P2, 180°]$. When the foldable screen of the electronic device 100 is in a half-folded state, the included angle (that is, the folding angle) a between the screen A and the screen B of the electronic device 100 meets: $\alpha \in (P1, P2)$. Herein, $0° < P1 < P2 < 180°$.

In a possible implementation, when duration in which the included angle between the first screen and the second screen remains between the first angle threshold and the second angle threshold is greater than a first time threshold (for example, 0.6 seconds), the electronic device detects that the foldable screen changes to the half-folded state. In this way, the electronic device can accurately identify that a user wants the foldable screen to enter the half-folded state. This improves determining accuracy.

S1402: When detecting that the foldable screen changes from the expanded state to the half-folded state, the electronic device displays a second interface on the first screen.

For example, the first screen may be the screen A in the foregoing embodiment, and the second screen may be the screen B in the foregoing embodiment. The first application may be the Camera application. When the first interface is displayed, the first application starts the camera. The first interface may be the Camera application interface 820 shown in FIG. 8B. The second interface may be the Camera application interface 830 shown in FIG. 8C. Display content (also referred to as an interface element) in the Camera application interface 830 is the same as display content (also referred to as an interface element) in the Camera application interface 820 shown in FIG. 8B.

According to this embodiment of this application, when the foldable screen of the electronic device 100 is in the half-folded state, if a foreground application (for example, a Camera application, or a WeChat application) that is run on the electronic device 100 and that supports window display adaptation starts the camera, the electronic device 100 may display an application interface of the foreground application on the screen A or the screen B of the foldable screen. In this way, a user can conveniently perform photographing, video calling, live broadcasting, or the like without holding the electronic device 100 steady with both hands.

In a possible implementation, when an included angle between a plane on which the first screen is located and a horizontal plane is less than a third angle threshold, the electronic device displays the second interface on the second screen. For example, the third angle threshold may be P3, and P3 ∈(0°, 45°). When the plane on which the first screen is located is nearly parallel to the horizontal plane (that is, an included angle β1 is less than a preset angle threshold P3 (for example, 10 degrees)), the electronic device 100 may switch to display, on the second screen, the Camera application interface displayed on the first screen, where P3 ∈(0°, 45°). The third angle threshold may be less than the second angle threshold. In this way, when photographing the sky or photographing the ground in a high building, the user does not need to look up to be dazzled by the sun or look down, and the electronic device 100 automatically displays, on a half screen (for example, the second screen) that is nearly vertical to the horizontal plane, an upper-layer application interface for starting the camera, to facilitate photographing of the user. For specific content, refer to the embodiment shown in FIG. 8D. Details are not described herein again.

In a possible implementation, the electronic device further includes a third screen, and when the foldable screen is folded, the third screen faces the first screen. The method further includes: After the electronic device enables a time-lapse photographing function, the electronic device receives a first input of the user for the second interface. In response to the first input, the electronic device displays a countdown prompt on the first screen and the third screen. The countdown prompt is used to prompt the user of remaining time for photographing the image captured by the camera.

The third screen may be the screen C in the embodiment shown in FIG. 9F. When the electronic device is in the half-folded state, and the first application (for example, a Camera application, or a WeChat application) enables the camera to perform countdown photographing, the electronic device may display a photographing countdown on the screen C. In this way, when the owner leaves the electronic device and performs automatic countdown photographing together with another person, the countdown may be displayed on the screen C, which is convenient for the user to make a photographing posture, thereby improving user experience. For specific content, refer to embodiments shown in FIG. 9A to FIG. 9F. Details are not described herein again.

In a possible implementation, in response to the first input, the electronic device displays, on the third screen, the image captured by the camera. For example, as shown in FIG. 9G, the electronic device displays, on the screen C, the photographing countdown prompt 933 and the image 934 captured by the rear-facing camera 802. For specific content, refer to the embodiment shown in FIG. 9G. Details are not described herein again.

In a possible implementation, the first application is associated with a second application. When detecting that the foldable screen changes from the expanded state to the half-folded state, the electronic device displays a third interface of the second application on the second screen. The first application may be the Camera application, and the second application may be a Gallery application. The second interface may be the Camera application interface 1040 shown in FIG. 10D, and the third interface may be the Gallery application interface 1050 shown in FIG. 10D. For specific content, refer to embodiments shown in FIG. 10A to FIG. 10D. Details are not described herein again.

In a possible implementation, the first application corresponds to a plurality of associated applications. When detecting that the foldable screen changes from the expanded state to the half-folded state, the electronic device displays options of the plurality of associated applications on the second screen. The electronic device receives a second input of the user for an option corresponding to a second application. The electronic device displays a third interface of the second application on the second screen in response to the second input. For specific content, refer to embodiments shown in FIG. 11A to FIG. 11C. Details are not described herein again.

In a possible implementation, the electronic device displays a switch control on the first screen or the second screen. The electronic device receives a third input of the user for the switch control. In response to the third input, the electronic device displays the third interface on the first screen, and displays the second interface on the second screen. For example, the switch control may be the switch control 1241 shown in FIG. 12C. For specific content, refer to embodiments shown in FIG. 12A to FIG. 12D. Details are not described herein again.

In a possible implementation, when the foldable screen changes from the half-folded state to a fully folded state, the electronic device may turn off the first screen and the second screen.

In some embodiments, when the foldable screen is in the expanded state, the electronic device displays the first interface of the first application in full screen on the foldable screen. The first interface includes the image captured by the camera and one or more operation controls. When detecting that the foldable screen changes from the expanded state to the half-folded state, the electronic device displays a fourth interface on the first screen, and displays a fifth interface on the second screen. The fourth interface includes the image captured by the camera, and the fifth interface includes the one or more operation controls. For example, the first interface may be the Camera application interface 1310 shown in FIG. 13A, the fourth interface may be the Camera application interface 1320 shown in FIG. 13B or FIG. 13C, and the fifth interface may be the Camera application interface 1330 shown in FIG. 13B or the Camera application interface 1340 shown in FIG. 13C. For specific content, refer to embodiments shown in FIG. 13A to FIG. 13C. Details are not described herein again.

In conclusion, the foregoing embodiments are merely intended for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A display method performed by an electronic device comprising a foldable screen, the foldable screen being foldable to form at least two screens comprising a first screen and a second screen; the method comprising:
    when the foldable screen is in an expanded state, in response to an operation applied to an icon of a camera application, displaying, by the electronic device, a first interface of the camera application in full screen on the foldable screen, wherein the first interface comprises a first image captured by a camera, a photographing control displayed on the second screen, and a setting control displayed on the first screen, and the first image captured by the camera being displayed on the first screen and the second screen; and
    when the foldable screen changes from the expanded state to a half-folded state, displaying, by the electronic device, a second image captured by the camera on the first screen, displaying the setting control on the second screen, and displaying the photographing control on the second screen;
    when the foldable screen is in the half-folded state and a timing photographing function is enabled,
    in response to a first user input, displaying, by the electronic device, a first countdown prompt and a third image captured by the camera on a third screen facing away from the first screen.

2. The method of claim 1, the method further comprising:
    displaying, by the electronic device in response to the first user input, a second countdown prompt and a fourth image captured by the camera on the first screen.

3. The method of claim 2, wherein the first countdown prompt and the second countdown prompt are used to prompt remaining time for the electronic device to photograph the image captured by the camera.

4. The method of claim 1, wherein the method further comprises:
    when the foldable screen is in the half-folded state, and an included angle between a plane on which the first screen is located and a horizontal plane is less than a third angle threshold, displaying, by the electronic device, the second image on the second screen.

5. The method of claim 1, wherein when duration in which the included angle between the first screen and the second screen remains between the first angle threshold and the second angle threshold is greater than a first time threshold, the electronic device detects that the foldable screen changes to the half-folded state.

6. The method of claim 5, wherein the first interface further comprises a timing option associated with the timing photographing function, the method further comprises:
    receiving, by the electronic device, a second user input applied to the timing option;
    in response to the second user input, enabling, by the electronic device, the timing photographing function.

7. The method of claim 1, wherein the camera is disposed on the same side of the third screen.

8. An electronic device, comprising:
    a foldable screen that is foldable to form at least two screens comprising a first screen and a second screen;
    a third screen, facing away from the first screen;
    one or more cameras,
    one or more memories comprising instructions;
    one or more processors, operatively coupled to the foldable screen, the third screen, the one or more cameras and the one or more memories, wherein the one or more processors execute the instructions to cause the electronic device to perform the following steps:
    when the foldable screen is in an expanded state, in response to an operation applied to an icon of a camera application, displaying, in full screen on the foldable screen, a first interface of the camera application, wherein the first interface comprises a first image captured by a camera, a photographing control displayed on the second screen, and a setting control displayed on the first screen, the first image captured by the camera being displayed on the first screen and the second screen; and
    when the foldable screen changes from the expanded state to a half-folded state, displaying a second image captured by the camera on the first screen, displaying the setting control on the second screen, and displaying the photographing control on the second screen;
    when the foldable screen is in the half-folded state and a timing photographing function is enabled,
    in response to a first user input, displaying a first countdown prompt and a third image captured by the camera on the third screen.

9. The electronic device of claim 8, wherein the electronic device is further caused to perform the following steps:
    in response to the first user input, displaying, by the electronic device, a second countdown prompt and a fourth image captured by the camera on the first screen.

10. The electronic device of claim 9, wherein the first countdown prompt and the second countdown prompt are used to prompt remaining time for the electronic device to photograph the image captured by the camera.

11. The electronic device of claim 8, wherein the electronic device is further caused to perform the following steps:
    when the foldable screen is in the half-folded state, and an included angle between a plane on which the first screen is located and a horizontal plane is less than a third angle threshold, displaying, by the electronic device, the second image on the second screen.

12. The electronic device of claim 8, wherein when duration in which the included angle between the first screen and the second screen remains between the first angle threshold and the second angle threshold is greater than a first time threshold, the electronic device detects that the foldable screen changes to the half-folded state.

13. The electronic device of claim 8, wherein the first interface further comprises a timing option; the electronic device is further caused to perform the following steps:

receiving, by the electronic device, a second user input applied to the timing option;

in response to the second user input, enabling, by the electronic device, the timing photographing function.

14. The electronic device of claim 8, wherein the camera is disposed on the same side of the third screen.

15. A computer-readable storage medium, comprising computer instructions for executing the method of claim 1.

* * * * *